United States Patent
Shabtay et al.

(10) Patent No.: US 10,818,000 B2
(45) Date of Patent: Oct. 27, 2020

(54) ITERATIVE DEFECT FILTERING PROCESS

(71) Applicant: Applied Materials Israel Ltd., Rehovot (IL)

(72) Inventors: Saar Shabtay, Mismeret (IL); Idan Kaizerman, Meitar (IL); Amir Watchs, Casesarea (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 16/102,112

(22) Filed: Aug. 13, 2018

(65) Prior Publication Data
US 2019/0012781 A1 Jan. 10, 2019

Related U.S. Application Data

(63) Continuation of application No. 15/019,894, filed on Feb. 9, 2016, now Pat. No. 10,049,441, which is a
(Continued)

(51) Int. Cl.
*G06T 7/00* (2017.01)
*G06K 9/68* (2006.01)
(Continued)

(52) U.S. Cl.
CPC .............. *G06T 7/0004* (2013.01); *G06K 9/52* (2013.01); *G06K 9/685* (2013.01); *G06T 7/0012* (2013.01);
(Continued)

(58) Field of Classification Search
CPC combination set(s) only.
See application file for complete search history.

(56) References Cited

U.S. PATENT DOCUMENTS 5,862,055 A 1/1999 Chen et al.
5,966,459 A * 10/1999 Chen ..................... G06K 9/00
348/126
(Continued)

FOREIGN PATENT DOCUMENTS

CN 1398348 A 2/2003
CN 1591811 A 3/2005
(Continued)

OTHER PUBLICATIONS

International Searching Authority, "Notification of Transmittal of the International Search Report and the Written Opinion of the International Search Authority, or the Declaration," for International Application No. PCT/US2015/053240, dated Nov. 24, 2015, 2 pages.
(Continued)

*Primary Examiner* — Jingge Wu
(74) *Attorney, Agent, or Firm* — Lowenstein Sandler LLP

(57) ABSTRACT

Data indicative of a group of defect candidates may be obtained. The data may be indicative of a group of defect candidates and may include values of attributes for each defect candidate of the group of defect candidates. Sub-groups of defect candidates may be iteratively selected for review using a review recipe to classify the defect candidates in each selected sub-group based on the values of attributes of respective defect candidates and classification results of previously reviewed defect candidates. The sub-groups may be selected until a sampling stop condition is fulfilled to obtain a classification output for the wafer. Instructions specifying at least one of the sampling stop condition, the inspection recipe, or the review recipe may be altered and additional defect candidates in a next wafer may be classified by using the altered instructions.

20 Claims, 15 Drawing Sheets

Related U.S. Application Data continuation of application No. 14/522,543, filed on Oct. 23, 2014, now Pat. No. 9,286,675.

(51) Int. Cl.
*G06K 9/52* (2006.01)
*G06K 9/46* (2006.01)

(52) U.S. Cl.
CPC ............ *G06K 2009/4666* (2013.01); *G06T 2207/10056* (2013.01); *G06T 2207/20112* (2013.01); *G06T 2207/30148* (2013.01)

(56) References Cited

U.S. PATENT DOCUMENTS

| | | | |
|---|---|---|---|
| 5,991,699 A | 11/1999 | Kulkarni et al. | |
| 7,198,964 B1 | 4/2007 | Cherry et al. | |
| 7,570,796 B2 | 8/2009 | Zafar et al. | |
| 7,756,658 B2 | 7/2010 | Kulkarni et al. | |
| 8,135,204 B1 | 3/2012 | Chen et al. | |
| 8,315,453 B2 | 11/2012 | Shlain et al. | |
| 8,781,781 B2 | 7/2014 | Kulkarni et al. | |
| 2002/0054703 A1 | 5/2002 | Hiroi et al. | |
| 2004/0032979 A1 | 2/2004 | Honda et al. | |
| 2004/0086168 A1 | 5/2004 | Kuwabara | |
| 2004/0218806 A1 | 11/2004 | Miyamoto et al. | |
| 2004/0228515 A1* | 11/2004 | Okabe | G06T 7/0004 382/145 |
| 2004/0234120 A1* | 11/2004 | Honda | G06T 7/0004 382/145 |
| 2005/0033528 A1* | 2/2005 | Toth | G01N 21/9501 702/35 |
| 2005/0104017 A1* | 5/2005 | Kimba | G06T 7/001 250/559.07 |
| 2005/0147287 A1* | 7/2005 | Sakai | G01N 21/9501 382/141 |
| 2005/0210423 A1 | 9/2005 | Liao et al. | |
| 2006/0067570 A1 | 3/2006 | Onishi et al. | |
| 2006/0102839 A1* | 5/2006 | Bhaskar | G06T 7/0004 250/310 |
| 2006/0133660 A1 | 6/2006 | Ogi et al. | |
| 2008/0032429 A1* | 2/2008 | Chen | G01N 21/8851 438/14 |
| 2008/0163140 A1* | 7/2008 | Fouquet | G03F 1/84 700/110 |
| 2008/0250384 A1 | 10/2008 | Duffy et al. | |
| 2008/0286885 A1 | 11/2008 | Izikson et al. | |
| 2009/0043527 A1 | 2/2009 | Park et al. | |
| 2009/0161943 A1 | 6/2009 | Yamashita et al. | |
| 2009/0299681 A1* | 12/2009 | Chen | G01N 21/9501 702/123 |
| 2011/0170091 A1* | 7/2011 | Chang | G01N 21/9501 356/237.5 |
| 2011/0202298 A1 | 8/2011 | Izikson et al. | |
| 2011/0276935 A1* | 11/2011 | Fouquet | G06T 7/0006 716/112 |
| 2012/0141013 A1 | 6/2012 | Gao et al. | |
| 2012/0229618 A1 | 9/2012 | Urano et al. | |
| 2012/0314054 A1* | 12/2012 | Chou | G05B 19/41875 348/87 |
| 2013/0035888 A1 | 2/2013 | Kandel et al. | |
| 2013/0064442 A1* | 3/2013 | Chang | G06T 7/001 382/149 |
| 2013/0310966 A1 | 11/2013 | MacNaughton et al. | |
| 2014/0072203 A1 | 3/2014 | Wu et al. | |
| 2014/0241610 A1* | 8/2014 | Duffy | G01N 21/9501 382/149 |
| 2014/0301630 A1* | 10/2014 | Kulkarni | G06T 7/0004 382/149 |
| 2014/0376801 A1* | 12/2014 | Karsenti | G06T 7/001 382/145 |
| 2015/0060667 A1 | 3/2015 | Yamaguchi et al. | |

FOREIGN PATENT DOCUMENTS

| | | |
|---|---|---|
| CN | 102422405 A | 4/2012 |
| CN | 103593670 A | 2/2014 |
| JP | 2000057349 A | 2/2000 |

OTHER PUBLICATIONS

Japanese Office Action for Japanese Patent Application No. 2017-522331, dated Aug. 1, 2019, 7 pages.
Chinese Office Action for Chinese Patent Application No. 2015800632771, dated Mar. 26, 2020, 26 pages.
Wong et al., "Stitching Defect Detection and Classification Using Wavelet Transform and BP Neural Network", Expert Systems with Applications, vol. 36, Issue 2, Part 2, pp. 3845-3856, relevant claims 1-20, dated Dec. 31, 2009, 12 pages.
Zeng "Research on CV-Based Bridge Surface Block Detection and Measurement Technology", School of Information Engineering Guandong University of Technology, May 2005, 98 pages.

\* cited by examiner

ITERATIVE DEFECT FILTERING PROCESS

RELATED APPLICATION

This patent application is a continuation of U.S. patent application Ser. No. 15/019,894 filed on Feb. 9, 2016, which is a continuation of U.S. patent application Ser. No. 14/522,543 filed on Oct. 23, 2014, now U.S. Pat. No. 9,286,675, each of which is incorporated by reference herein.

BACKGROUND OF THE INVENTION

Various objects such as semiconductor wafers, printed circuit boards, solar panels and microelectromechanical (MEMS) devices are manufactured by manufacturing processes that are highly complex and expensive.

Manufacturing process errors may result in yield limiting defects. The manufacturing is assisted by a Yield Management System (YMS). The YMS collects and analyzes manufacturing and test data coming from various tools at various manufacturing stages. The YMS is aimed at quickly identify tools and processes that impact yield.

Defect detection is usually performed by applying an inspection process that is followed by a review process. The inspection process may be performed by an optical inspection tool or by an electron beam inspection tool, and is aimed to find suspected defects. The review process is usually executed by a scanning electron microscope (SEM) and is aimed to determine which suspected defects are actual defects and if so—to which class (type) of defects these actual defects belong to. The review process includes acquiring SEM images of suspected defects and processing the SEM images by a classifier.

Typically, the inspection tools and the review tools are connected via a fab communication system and the inspection-review flow is controlled by the YMS. For example, the YMS assign a lot of semiconductor wafers to a certain inspection tool (for either an optical or ebeam inspection). The results of inspection—list of wafer locations representing possible defects and certain inspection attributes associated with these locations—are provided to the YMS. The YMS, in a manual, semi-automated for fully automated manner, identifies locations of interest. For example, the inspection tool and/or the YMS may identify a certain result as a 'nuisance' or a 'true defect'; The YMS typically selects a subset of the 'true defect' locations and sends the locations of interest to an assigned review tool. The review tool reviews the locations of interest and their vicinity and generates additional data e.g. SEM images, respective image processing attributes, defects class (type), and returns data to the YMS. The number of suspected defects per object, as provided by today's inspection systems, may exceed one million. The review process (especially the acquisition of the SEM images) is relatively long. Imaging each one of the suspected defects will result in a review process that will be unreasonably long. Thus, many techniques are known in the art for improving inspection throughput, review throughput, quality of inspection results, quality of review results, YMS operation.

Furthermore, current inspection systems employ a fixed nuisance filter that outputs a limited number of suspected defects per wafer. The fixed nuisance filter is being setup during the recipe setup process and therefore cannot properly track production changes that occur in the manufacturing process and/or in the inspection process over time. For each suspected defect a number of attributes are calculated. The low resolution of the inspection system, relative to SEM, may provide inadequate information about the suspected defects.

Accordingly, there is a growing need to provide a higher sensitivity results out of wafer inspection combined with more effective and accurate filtering mechanism that will maintain the true defect of interest while filtering the nuisance. There is a growing need to automate systems and processes for measurement optimization. There is a growing demand for improved data interpretation for management of semiconductor fabrication yield.

SUMMARY OF THE INVENTION

According to an embodiment of the invention there may be provided a method for classifying defects of a wafer, the method may be executed by a computerized system, the method may include:
  a. obtaining defect candidate information about a group of defect candidates, wherein the defect candidate information may include values of attributes per each defect candidate of the group;
  b. selecting, by a processor of the computerized system, a selected sub-group of defect candidates in response to values of attributes of defect candidates that belong to at least the selected sub-group;
  c. classifying defect candidates of the selected sub-group to provide selected sub-group classification results;
  d. repeating, until fulfilling a stop condition:
    i. selecting an additional selected sub-group of defect candidates in response to (a) values of attributes of defect candidates that belong to at least the additional selected sub-group; and (b) classification results obtained from classifying at least one other selected sub-group; and
    ii. classifying defect candidates of the additional selected sub-group to provide additional selected sub-group classification results.

The obtaining of the defect candidate information may include inspecting the wafer with an optical inspection device to provide the defect candidate information.

The obtaining of the defect candidate information may include receiving the defect candidate information from an optical inspection device.

The classifying of the defects candidates of the selected sub-group may include imaging the defects candidate by a charged particle beam to generate charged particle images; and processing the charged particle images by a defect classifier to provide the selected sub-group classification results.

The method may include providing defect information that represents defect candidates that were classified as defects of at least one class of defects.

The fulfilling of the stop condition may include obtaining classification results having a purity level that exceeds a purity threshold.

The method may include obtaining one or more images of each defect candidate of each selected sub-group; wherein the fulfilling of the stop condition may include obtaining a predefined number of images.

The method may include obtaining one or more images of each defect candidate of each selected sub-group; wherein the fulfilling of the stop condition may include obtaining a predefined number of images of a certain defect type.

The selecting of the additional selected sub-group may include: selecting a selected portion of the group in response to classification results that were obtained from classifying the at least one other selected sub-group; and selecting the additional selected sub-group out of the selected portion of the group in response to values of attributes of defect candidates that belong to the portion of the group, wherein the portion of the group may include the additional selected sub-group.

The selected portion of the group does may not include defect candidates that belong to any previously selected sub-group.

The method may include selecting a selected portion of the group by: calculating segment scores of segments of an attribute hyperspace; wherein defect candidates of the group are represented in the attribute hyperspace by defect candidate defect candidate representations indicative of the values of the attributes of the defect candidate defect candidates; and selecting a selected segment in response to the segment scores; wherein the selected portion of the group may include defect candidates that are represented by defect candidate defect candidate representations that belong to the selected segment.

The method may include calculating a segment score of a segment in response to a parameter of a distribution of defect candidate defect candidate representations within the segment.

The method may include calculating a segment score of a segment in response to at least one classification result related to at least one defect candidates us having defect candidate defect candidate representations within the segment.

The method may include calculating a segment score of a segment in response to a parameter of a distribution of defect candidate defect candidate representations of defect candidates that were classified as defects.

Values of attributes of defect candidates may span an attribute hyperspace and the method may include segmenting the attribute hyperspace to segments.

The method may include re-segmenting the attribute hyperspace to segments in response to at least one selected sub-group classification results.

The method may include performing multiple classification iterations to provide multiple classification iteration results; and adapting adjustable classification thresholds and segmenting an attribute hyperspace to segments in response to the multiple classification iteration results; wherein the adjustable classification thresholds are utilized during the multiple classification iterations.

The method may include receiving the stop condition from a person.

The classifying of the defect candidates may include receiving classification information from a person.

The method may include receiving level of interest information related to at least one out of regions of the wafer and a class of defects; and wherein at least one step out of the selecting of the selected sub-group of defect candidates and the classifying of the defect candidates may be responsive to the level of interest information.

The processor of the computerized system may be coupled to a defect classifier and to a Yield Management System (YMS) via a network.

The processor of the computerized system may be coupled to an inspection tool and to a review tool via the network.

The processor of the computerized system may be coupled to multiple inspection tools and to a plurality of review tools via the network.

The processor of the computerized system may be included in a defect classifier.

The processor of the computerized system may be coupled to a defect classifier and to a Yield Management System (YMS) via a network.

The obtaining of defect candidate information may include generating the defect candidate information by an inspection module that may be coupled to the processor of the computerized system.

According to an embodiment of the invention there may be provided a non-transitory computer readable medium that stores instructions that once executed by a computer will cause the computer to execute the steps of:
  a. obtaining defect candidate information about a group of defect candidates, wherein the defect candidate information may include values of attributes per each defect candidate of the group;
  b. selecting a selected sub-group of defect candidates in response to values of attributes of defect candidates that belong to at least the selected sub-group;
  c. classifying defect candidates of the selected sub-group to provide selected sub-group classification results;
  d. repeating, until fulfilling a stop condition: selecting an additional selected sub group of defect candidates in response to (a) values of attributes of defect candidates that belong to at least the additional selected sub-group; and (b) classification results obtained from classifying at least one other selected sub-group; and classifying defect candidates of the additional selected sub-group to provide additional selected sub-group classification results.

According to an embodiment of the invention there may be provided a computerized system for classifying defects of a wafer, the computerized system may comprise a processor and a memory unit; wherein the processor is arranged to execute at least the following stages of:
  a. obtaining defect candidate information about a group of defect candidates, wherein the defect candidate information may include values of attributes per each defect candidate of the group;
  b. selecting a selected sub-group of defect candidates in response to values of attributes of defect candidates that belong to at least the selected sub-group;
  c. classifying defect candidates of the selected sub-group to provide selected sub-group classification results;
  d. repeating, until fulfilling a stop condition:
    i. selecting an additional selected sub-group of defect candidates in response to (a) values of attributes of defect candidates that belong to at least the additional selected sub-group; and (b) classification results obtained from classifying at least one other selected sub-group; and
    ii. classifying defect candidates of the additional selected sub-group to provide additional selected sub-group classification results.

According to an embodiment of the invention there may be provided a computerized system that may include a processor and a memory unit; wherein the processor is arranged to execute at least the following stages of:
  a. obtaining defect candidate information about a group of defect candidates, wherein the defect candidate information may include values of attributes per each defect candidate of the group;
  b. selecting, by a processor of the computerized system, a selected sub-group of defect candidates in response to values of attributes of defect candidates that belong to at least the selected sub-group;
  c. sending to a defect classifier information about the selected sub-group of defect candidates;

d. receiving from the defect classifier selected sub-group classification results;

e. repeating, until fulfilling a stop condition:
   i. selecting an additional selected sub-group of defect candidates in response to (a) values of attributes of defect candidates that belong to at least the additional selected sub-group; and (b) classification results obtained from a classifying, by the defect classifier, at least one other selected sub-group;
   ii. sending to the defect classifier information about the additional selected sub-group; and
   iii. receiving from the defect classifier additional selected sub-group classification results.

According to an embodiment of the invention there may be provided a method for wafer inspection, defect detection and classification, the method may include:

a. inspecting a wafer with an optical inspection device to provide defect candidate information about a group of defect candidates, wherein the defect candidate information may include values of multiple attributes per each defect candidate of the group; wherein the multiple attributes may include attributes that represent optical inspection parameters of the optical inspection device;

b. obtaining, by a charged particle beam tool, charged particle beam images of defect candidates of a portion of the group of defect candidates;

c. processing the charged particle beam images by a defect classifier to provide portion classification results; and d. outputting at least a part of the provide portion classification results.

The charged particle beam tool may be a SEM, a TEM, a STEM or an ion imager.

The method may include preventing a display of the defect candidate information to an operator of the optical inspection device.

The portion of the group of defect candidates may include multiple selected sub-groups of defect candidates.

According to an embodiment of the invention there may be provided a method for wafer inspection, defect detection and classification, the method may include:

a. inspecting, at a first resolution and a first throughput, a wafer with an first tool to provide defect candidate information about a group of defect candidates, wherein the defect candidate information may include values of multiple attributes per each defect candidate of the group; wherein the multiple attributes may include attributes that represent optical inspection parameters of the optical inspection device;

b. obtaining, at a second resolution and a second throughput, by a second tool, second tool images of defect candidates of a portion of the group of defect candidates;

c. processing the second tool images by a defect classifier to provide portion classification results; and d. outputting at least a part of the provide portion classification results.

According to an embodiment of the invention there may be provided a method for wafer inspection, defect detection and classification, the method may include:

a. inspecting, at a first resolution and a first throughput, a wafer with an first tool to provide defect candidate information about a group of defect candidates, wherein the defect candidate information may include values of multiple attributes per each defect candidate of the group; wherein the multiple attributes may include attributes that represent optical inspection parameters of the optical inspection device;

b. obtaining, at a second resolution and a second throughput, by a second tool, second tool images of defect candidates of a portion of the group of defect candidates; wherein the second resolution is higher than the first resolution and the first throughput is higher than the second throughput;

c. sending the second tool images to a defect classifier;

d. receiving from the defect classifier portion classification results; and e. outputting at least a part of the provide portion classification results.

According to an embodiment of the invention there may be provided a method for classifying defects of a wafer, the method may be executed by a computerized system, the method may include:

a. obtaining defect candidate information about a group of defect candidates, wherein the defect candidate information may include values of attributes per each defect candidate of the group;

b. selecting, by a processor of the computerized system, a selected sub-group of defect candidates in response to values of attributes of defect candidates that belong to at least the selected sub-group;

c. sending to a defect classifier information about the selected sub-group of defect candidates;

d. receiving from the defect classifier selected sub-group classification results;

e. repeating, until fulfilling a stop condition:
   i. selecting an additional selected sub-group of defect candidates in response to (a) values of attributes of defect candidates that belong to at least the additional selected sub-group; and (b) classification results obtained from a classifying, by the defect classifier, at least one other selected sub-group;
   ii. sending to the defect classifier information about the additional selected sub-group; and
   iii. receiving from the defect classifier additional selected sub-group classification results.

According to an embodiment of the invention there may be provided a non-transitory computer readable medium that stores instructions that once executed by a computer will cause the computer to execute the steps of:

a. obtaining defect candidate information about a group of defect candidates, wherein the defect candidate information may include values of attributes per each defect candidate of the group;

b. selecting, a selected sub-group of defect candidates in response to values of attributes of defect candidates that belong to at least the selected sub-group;

c. sending to a defect classifier information about the selected sub-group of defect candidates;

d. receiving from the defect classifier selected sub-group classification results;

e. repeating, until fulfilling a stop condition:
   i. selecting an additional selected sub-group of defect candidates in response to (a) values of attributes of defect candidates that belong to at least the additional selected sub-group; and (b) classification results obtained from a classifying, by the defect classifier, at least one other selected sub-group;
   ii. sending to the defect classifier information about the additional selected sub-group; and iii. receiving from the defect classifier additional selected sub-group classification results.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
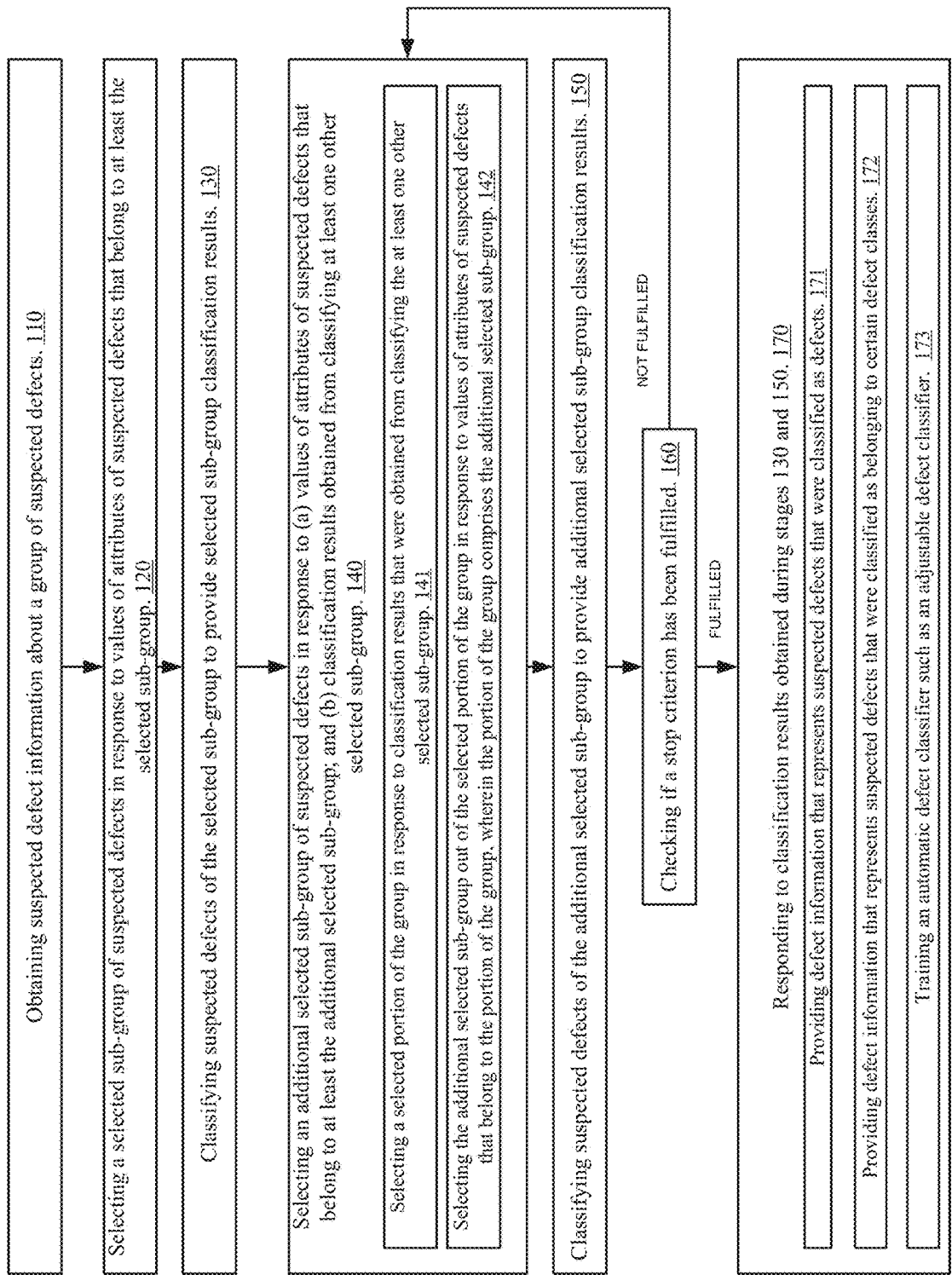
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

A group of defect candidates is also referred to as a group. A portion of the group of the defect candidates is also referred to as a portion of the group. A sub-group of defect candidates is also referred to as a sub-group.

The terms "tool", "system" and "device" are used in an interchangeable manner.

The terms "computer" and "computerized device" are used in an interchangeable manner.

The specification provides various examples of automatic defect classification (ADC) processes. It is noted that these are merely non-limiting examples and that the application is not limited by the examples of ADC processes illustrated in the specification.

It is noted that any ADC process may be fully automatic, partially automatic of fully manual. Accordingly, at least a stage of defect classification (performed by an ADC process) may be responsive to inputs provided by a person. The person may be a user or operator of any of the devices and/or tools illustrated in the specification.

The person may, for example, classify defects, define defects of interest, define areas of an object that are of interest, and the like. The person may define two or more interest levels and is not limited to defining only non-interesting areas and interesting areas.

The following examples refer to an inspection tool and a review tool. Any review tool and any inspection tool may use one or more optical beams and/or one or more charged particle beams. Non-limiting examples of an inspection tool may include an ultraviolet (UV) inspection tool, an extreme UV inspection tool, a deep UV inspection tool, a charged particle beam inspection tool and the like. Non-limiting examples of a review tool may include a scanning electron microscope (SEM), a transmissive electron microscope (TEM), an STEM, an ion beam imager, and the like.

Any of the examples provide din the specification are non-limiting examples of various embodiments of the invention.

FIG. 1 illustrates method 100 according to an embodiment of the invention. Method 100 is used for filtering defect candidates. The filtering includes selecting only some of the defect candidates to undergo a classification process. The classification can be performed by Automatic Defect Classification methods (ADC). Method 100 can be performed on the SEM or on a specific server. Method 100 can be performed after each defect or for a group of defects. Non-selected defect candidates can be ignored. Out of the defect candidates that undergo a classification process some may be classified as non-defects, some may be classified to one or more class of detects of interest and some may be classified to one or more class of that are not of interest. The classes of interest may be defined by a user, or can be defined automatically.

The selection of defect candidates to undergo the classification process may be done in multiple iterations. According to an embodiment of the invention, as least some of the iterations are responsive to results of the classification process.

Method 100 may start by step 110 of obtaining defect candidate information about a group of defect candidates. The defect candidate information includes values of attributes per each defect candidate of the group.

The obtaining of the defect candidate information can include performing a defect inspection process. The defect inspection process may be executed without applying a fixed nuisance filter or without substantially filtering out attributes related to the defect candidates.

The obtaining of the defect candidate information may be executed without performing the defect inspection process. In this case stage 110 include receiving defect candidate information that was generated during (or as a result of) an inspection process.

The number of defect candidates of the group may be very big—it may exceed one or few hundred defect candidates, one or few million defects and the like. The term few may refer to a number that ranges between 1 and 10.

The number of attributes (per defect candidates) may be very big and the attributes may include attributes of multiple types. For example, the number of attributes may range between 1 and 1000, between 10 and 500, between 30 and 200 and then like. The number of attributes may exceed 1000.

The invention is not limited by the type of inspection process that is used for generating the defect candidate information. The inspection process may include (a) an illumination process during which the object is illuminated with radiation, (b) a collection process during which radiation is collected from the object, (c) a detection process during which detection signals that are responsive to the collected radiation are being generated, and (d) a processing of the detection signals.

The defect candidate attributes may reflect any one of these processes or a combination thereof. It may include information about process imperfections, biases, deviations, optical parameters, and the like. The attributes may include inspection tool attributes, manufacturing process attributes, design attributes, yield attributes, and other inspection attributes provided from one or more other inspection tool.

The attributes of a defect candidate may represent at least one out of the following: (a) defect candidate pixels information, (b) information about the vicinity of the defect candidates, (c) information about one or more sensing element of a sensor that detected radiation from the defect candidate (for example—location in a sensor that includes multiple sensing elements, dynamic range, sensitivity threshold, bias and the like), (d) information related to a scanning scheme used to acquire the defect candidate (for example—scanning scheme accuracy, location of the defect candidate in relation to a scan line, scanning scheme mechanical noises, and the like), (e) information about illumination conditions applied to acquire the defect candidate (for example—intensity of light source, frequency of radiation, polarization of light source, speckles, temperature of the object or its surroundings, vacuum level at the vicinity of the object, position of defect candidate in relation to an optical axis of the illumination path, and the like), (f) information about collection conditions applied to acquire the defect candidate (for example, attenuation of a collection path, aberrations of the collection path, position of defect candidate in relation to an optical axis of the collection path, and the like) (g) design related information—computer aided design (CAD) structure or typical properties, or transformation of these properties, of the design in vicinity of defect location. The design related information can also be a processed CAD data represented by regions of interest or noise measures. (h) information about manufacturing history of the inspected wafer such as process step, process tool, lithography and the like (i) information about global and local defect density on the wafer and between wafers (signatures, die stacking, etc. . . . ).

Multiple defect candidate attributes may be regarded as "internal" attributes that were usually not outputted by an inspection tool. For example—referring to the example above—attributes (d), (e), (f), (h) and (i) may be considered internal or external inspection tool information. Yet for another example—while an identity of the sensor that detected a defect may be regarded as an external attribute at least some of the parameters of the sensor (location in a sensor that includes multiple sensing elements, dynamic range, sensitivity threshold, bias and the like) may be considered as internal attributes. Yet for a further example—external attributes may include attributes (a), (b) (g) and (i). Yet for a further example—external attributes may include defect SNR, grey level difference, shape and the like.

Step 110 may be followed by step 120 of selecting a selected sub-group of defect candidates in response to values of attributes of defect candidates that belong to at least the selected sub-group. This is the first selected sub-group out of multiple selected sub-groups.

The invention is not limited by the manner by which the selecting of defects candidates in response to values of attributes is performed. For example, many selection methods known in the art for selecting defects out of inspection results can be implemented, with appropriate modifications, without departing from the scope of the invention. For example—the selection of the selected sub-group of defect candidates may be responsive to levels of interest defined automatically, semi-automatically or manually by a person or another tool.

Step 120 may be followed by step 130 of classifying defect candidates of the selected sub-group to provide selected sub-group classification results.

The selected sub-group classification results may indicate which defect candidates (of the selected sub-group) belong to defect classes and which defect candidates cannot be classified to a defect class. Additionally or alternatively, the selected sub-group classification results may indicate which defect candidates should not be regarded as defects or not regarded as defects of interest. Defects of interest may belong to one or more classes of defects that were defined as being of interest.

Usually, but the invention is not limited thereto; classification should be done automatically by an automatic defect classifier (ADC). ADC can use a train set for learning a mathematical or statistical classification model or use a predefined set of rules defined by an operator. The invention is not limited by the type of ADC that is used. Many of the automatic defect classifiers that are commonly used for the fabrication of semiconductor devices can be used with the appropriate modifications without departing from the scope of the invention.

After the completion of steps 120 and 130 a first selected sub-group classification results is obtained. Method 100 may then proceed to steps 140 and 150 for obtaining one or more additional selected sub-group classification results, while taking into account previously obtained classification results. Steps 140 and 150 can be repeated until a stop criterion is fulfilled.

Step 130 may be followed by step 140 of selecting an additional selected sub-group of defect candidates in response to (a) values of attributes of defect candidates that belong to at least the additional selected sub-group; and (b) classification results obtained from classifying at least one other selected sub-group. During a first iteration of step 140 the classification results may be those obtained during step 130.

Step 140 may be followed by step 150 of classifying defect candidates of the additional selected sub-group to provide additional selected sub-group classification results.

Each additional selected sub-group classification results may indicate which defect candidates (of the additional selected sub-group) belong to defect classes and which defect candidates cannot be classified to a defect class. Additionally or alternatively, each additional selected sub-group classification results may indicate which defect candidates should be not be regarded as defects or not regarded as defects of interest. Defects of interest may belong to one or more classes of defects that were defined as being of interest.

Step 150 may be followed by step 160 of checking if a stop criterion has been fulfilled. If so—jumping to step 170. Else—jumping to step 140.

The stop criterion can be fulfilled, for example, when at least one of the following occurs:
  a. Reaching a predetermined number of iterations of steps 140 and 150.
  b. Obtaining classification results having a purity level that exceeds a purity threshold or reject level below a specific threshold Purity refers to the percentage of the remaining defects—those found by the ADC system to be classifiable and not rejected—that are classified correctly. U.S. Pat. No. 8,315,453 discloses a classifier that optimizes purity and is incorporated herein by reference.
  c. Obtaining a predetermined number of images of defects of interest (DOI) or a specific DOI type.

Step 170 may include responding to classification results obtained during steps 130 and 150.

Step 170 may include, for example:
  a. Providing (171) defect information that represents defect candidates that were classified as defects.
  b. Providing (172) defect information that represents defect candidates that were classified as belonging to certain defect classes. For example, belonging to one or more classes of defect of interest.
  c. Training (173) an automatic defect classifier such as an adjustable defect classifier. Training (173) can alternatively include participating in such training. The participation may include sending classification results to the adjustable defect classifier.

The defect information may be a defect map but other types of information can be provided. It may include the locations of the defects and one or more defect attributes per defect.

According to an embodiment of the invention step 140 may include two phases:
  a. Selecting (141) a selected portion of the group in response to classification results that were obtained from classifying the at least one other selected sub-group. For example, The selected portion of the group may be selected so that it does not include defect candidates that belong to any previously selected sub-group.
  b. Selecting (142) the additional selected sub-group out of the selected portion of the group in response to values of attributes of defect candidates that belong to the portion of the group, wherein the portion of the group comprises the additional selected sub-group. For example, the same selection method used in step 110 can be used for performing the selecting step 142.

It is noted that the same attributes may be used during different classification processes (stages 130 and 150). It should also be noted that different attributes may be used during different classification processes. in addition or alternatively, the attributes used during a classification process may include all of the attributes included in the defect candidate information (step 110) or may include a part of the attributes included in the defect candidate information (step 110).

Figure 2:
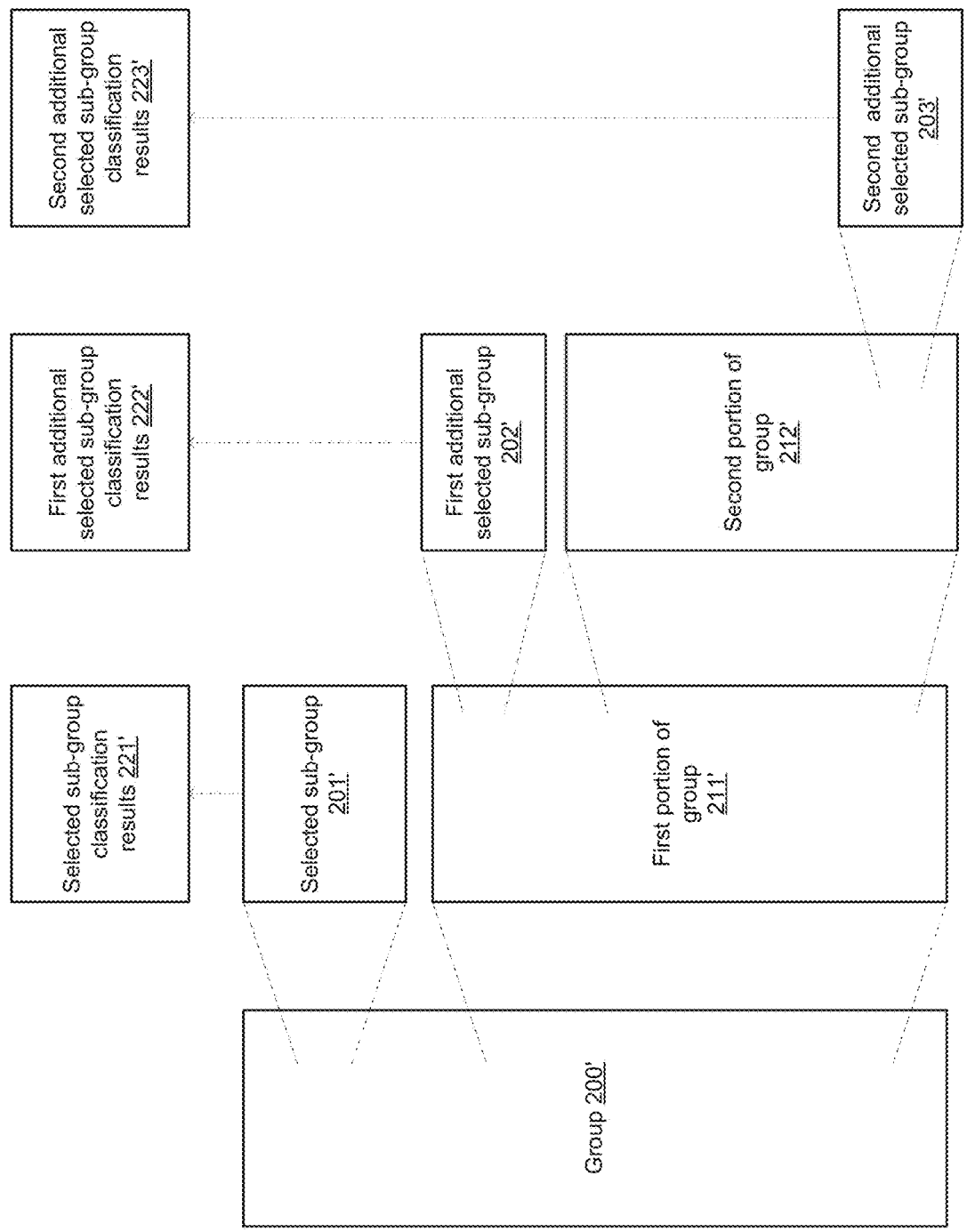
FIG. 2 illustrates a group of defect candidates, a selected sub-group of defect candidates, first and second additional selected sub-groups of defect candidates, first and second portions of the group, selected sub-group classification results, first additional selected sub-group classification results and second additional selected sub-group classification results according to an embodiment of the invention.

FIG. 2 illustrates a group 200', selected sub-group 201', first and second additional selected sub-groups 202' and 203', first and second portions 211' and 212' of the group, selected sub-group classification results 221', first additional selected sub-group classification results 222' and second additional selected sub-group classification results 223' according to an embodiment of the invention.

As illustrated by table 1 and by FIG. 2, different selected sub-groups are selected from different combinations of defect candidates (the group itself, any one of the portions of the group), and different selected sub-group classification results are obtained.

TABLE 1

| Step of method 100 | Selected sub-group | Combination of defect candidates from which the selected sub-group is being selected | Selected sub-group classification results |
|---|---|---|---|
| 120 | Selected sub-group 201' | Group 200' | |
| 130 | Selected sub-group 201' | | Selected sub-group classification results 221' |
| First iteration of step 140 | First additional selected sub-group 202' | First portion 211' (does not include previously selected sub-group 201') | |
| First iteration of step 150 | First additional selected sub-group 202' | | First additional selected sub-group classification results 222' |
| Second iteration of step 140 | Second additional selected sub-group 203' | Second portion 212' (does not include previously selected sub-groups 201' and 202') | |
| Second iteration of step 150 | Second additional selected sub-group 203' | | Second additional selected sub-group classification results 223' |

The selection of any selected sub-group may be responsive to the values of attributes of defect candidates. Each defect candidate of the group can be represented in an attribute hyperspace by a defect candidate representation indicative of the values of the attributes of the defect candidates. The attribute hyperspace is spanned by attributes of the defect candidates.

Figure 3:
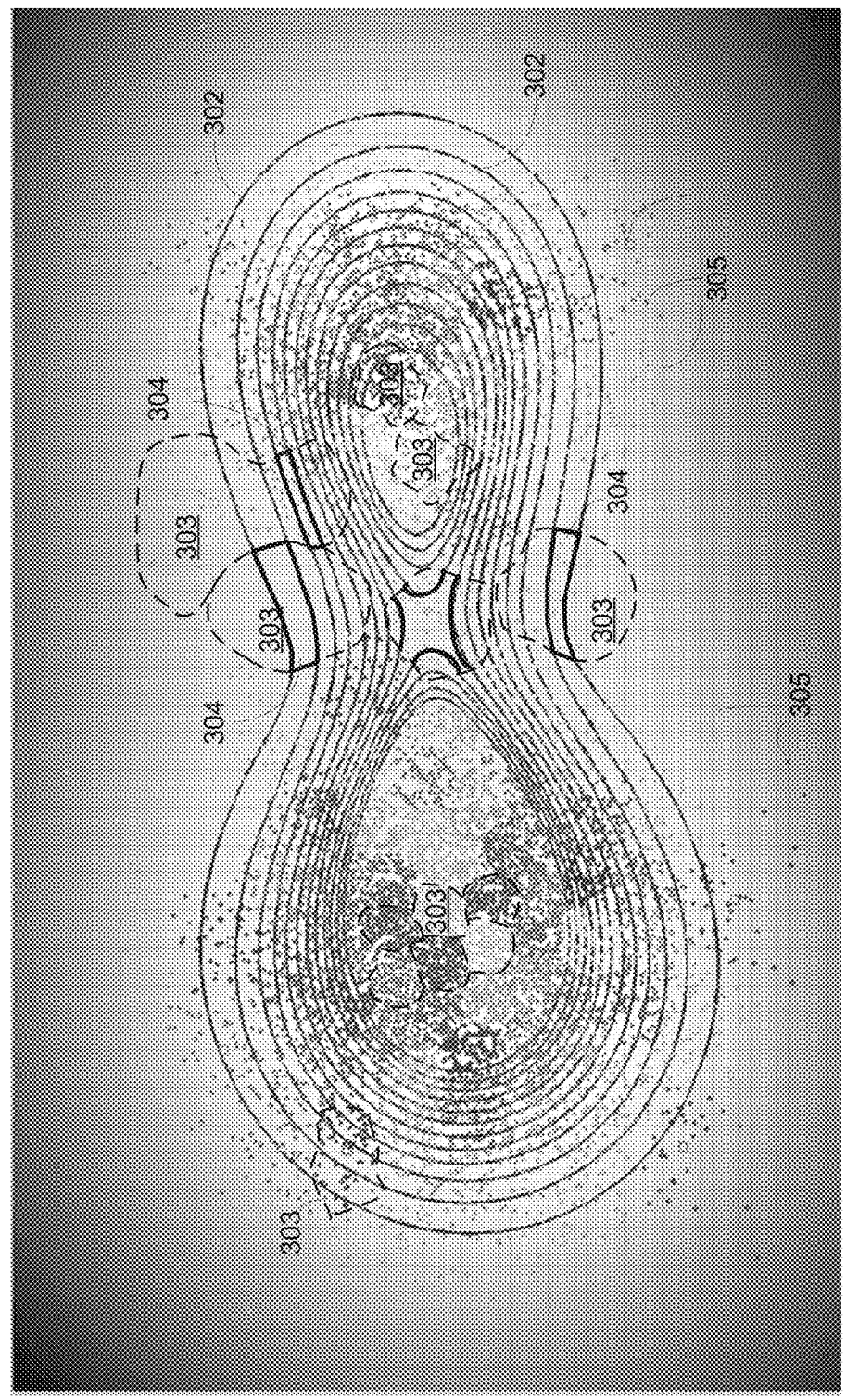
FIG. 3 illustrates an attribute hyperspace, multiple regions of the attribute hyperspace, multiple clusters of defect candidates representations, and segments of the attribute hyperspace, according to an embodiment of the invention.

The attribute hyperspace may include more than two dimensions but for simplicity of explanation FIG. 3 illustrates a two-dimensional attribute hyperspace. The x-axis of the illustrated attribute hyperspace represents values of one attribute and the y-axis represents a value of another attribute.

FIG. 3 illustrates attribute hyperspace 301, multiple regions 302, multiple clusters 303 of defect candidates representations 305, and segments 304 of the attribute hyperspace 301, according to an embodiment of the invention. I do not think we should disclose FIG. 3.

Segments 304 of FIG. 3 are intersections between regions 302 and clusters 303.

It is assumed that the defect candidate representations 305 represent all the defect candidates of group 200'.

The attribute hyperspace 301 may be segmented in various manners. FIG. 3 illustrates a result of a triple phase segmentation process that include the following phases:
  a. Partitioning the attribute hyperspace to multiple regions 302.
  b. Defining and/or receiving clusters 303 of defect candidates.
  c. Defining segments 304 in response to the regions 302 and the clusters 303. FIG. 3 illustrates segments 304 that are defined as intersections between regions 302 and clusters 303.

It is noted that one, two or more than three phase segmentation processes may be applied in order to provide multiple segments 303.

In FIG. 3 the multiple regions 302 represent different percentiles of the representations of the defect candidates of the group. These percentiles reflect a distribution of values of the pair of attributes (of the defect candidates of the group) that span the attribute hyperspace of FIG. 3.

Figure 4:
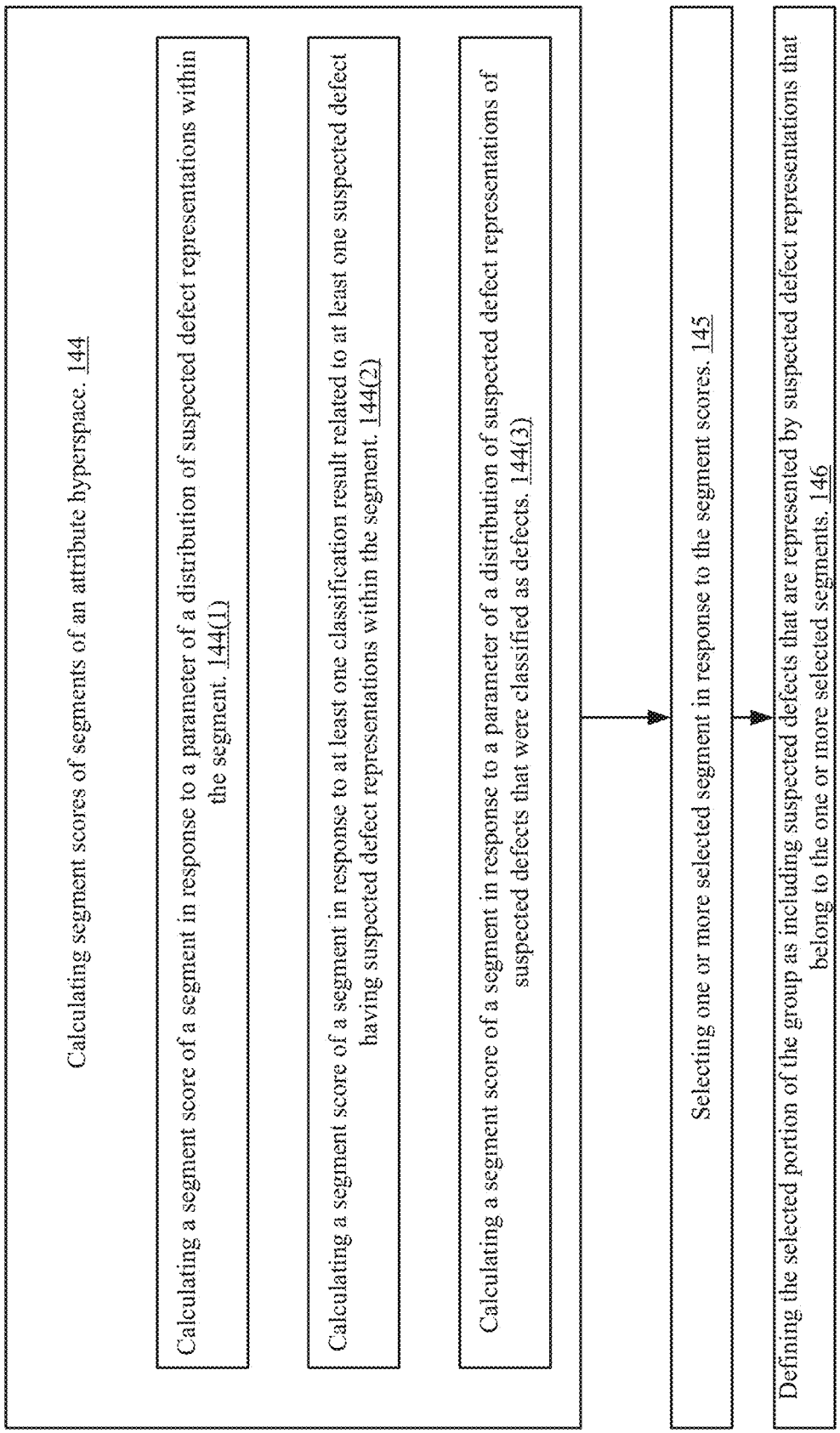
FIG. 4 illustrates a step of the method of FIG. 1 according to an embodiment of the invention.

FIG. 4 illustrates step 141 of method 100 according to an embodiment of the invention.

Step 141 may include the steps of:
  a. Calculating (144) segment scores of segments of an attribute hyperspace.
  b. Selecting (145) one or more selected segment in response to the segment scores.
  c. Defining (146) the selected portion of the group as including defect candidates that are represented by defect candidate representations that belong to the one or more selected segments.

Step 144 may include at least one of the following:
  a. Calculating (144(1)) a segment score of a segment in response to a parameter of a distribution of defect candidate representations within the segment. The parameter may, for example, reflect the number of defect candidates within the segment.
  b. Calculating (144(2)) a segment score of a segment in response to at least one classification result related to at least one defect candidate having defect candidate representations within the segment. For example—the method may prioritize selecting segments that do not include defect candidates that were previously classified as defects, classified as defects of a certain defect class, and the like.
  c. Calculating (144(3)) a segment score of a segment in response to a parameter of a distribution of defect candidate representations of defect candidates that were classified as defects. The parameter may be, for example, a defect to defect candidate ratio.

For example, assuming that defects of interest are relatively few in relation to the population of defect candidates (for example—out of one million defect candidates only one hundred defect candidates represents defects of interest) then higher scores may be assigned to less dense segments and to segments that do not include already detected defects of interest.

Any mathematical function can be applied in order to select the one of more segments to be selected.

The segmentation of the attribute hyperspace may be included in method 100 or may be executed as a part of another method that may be executed by a computerized entity that differs from the computerized entity that executes method 100.

Figure 5:
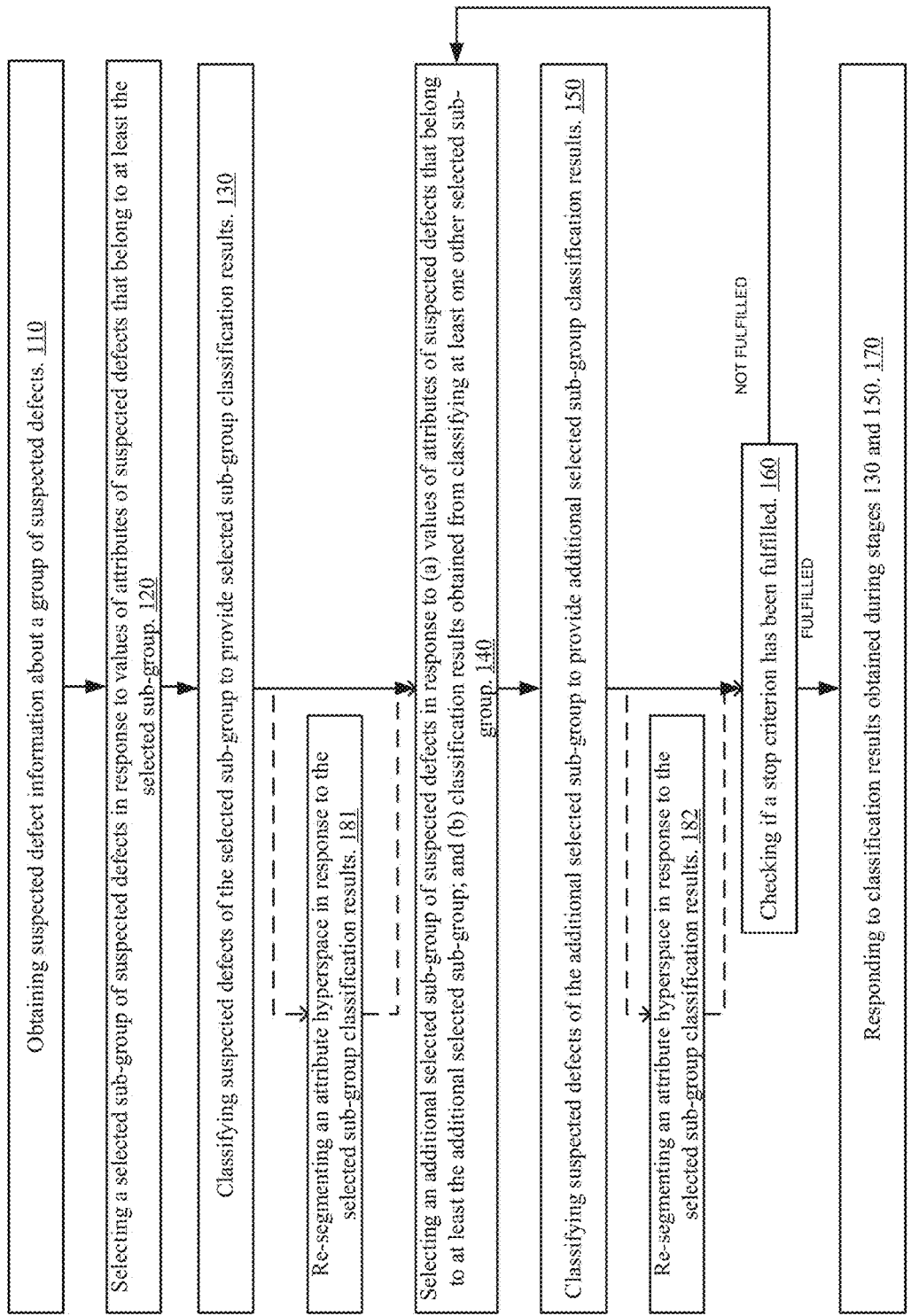
FIG. 5 illustrates a method according to an embodiment of the invention.

According to an embodiment of the invention the segmentation may change over time. For example—the attribute hyperspace may be re-segmented to segments in response to classification results. The re-segmentation may include changing the clustering of defect candidate FIG. 5 illustrates method 101 according to an embodiment of the invention.

As will be illustrated below—method 101 of FIG. 5 differs from method 100 of FIG. 1 by including additional steps 181 and 182.

Method 101 may start by step 110 of obtaining defect candidate information about a group of defect candidates.

Step 110 may be followed by step 120 of selecting a selected sub-group of defect candidates in response to values of attributes of defect candidates that belong to at least the selected sub-group.

Step 120 may be followed by step 130 of classifying defect candidates of the selected sub-group to provide selected sub-group classification results.

Step 130 may be followed by steps 181 and 140.

Step 181 may include re-segmenting an attribute hyperspace in response to the selected sub-group classification results. Step 181 may be followed by step 140. For example—if the classification process finds a clear border between defects of interest and defect candidates that should be ignored—the re-segmentation may cause this boarder to be positioned between segments or to form a boarder of one or more segment.

Step 130 may be followed by step 140 selecting an additional selected sub-group of defect candidates in response to (a) values of attributes of defect candidates that belong to at least the additional selected sub-group; and (b) classification results obtained from classifying at least one other selected sub-group.

Step 140 may be followed by step 150 of classifying defect candidates of the additional selected sub-group to provide additional selected sub-group classification results.

Step 150 may be followed by steps 160 and 182.

Step 182 may include re-segmenting an attribute hyperspace in response to the additional selected sub-group classification results. Step 182 may be followed by step 160.

Step 160 may include checking if a stop criterion has been fulfilled. If so—jumping to step 170. Else—jumping to step 140.

Step 170 may include responding to classification results obtained during steps 130 and 150.

It is noted that method 101 may include only one of steps 181 and 182. Additionally or alternatively, step 170 may include at least one of steps 181 and 182.

The classifications results (obtained during steps 130 and/or 150) can also be used for adjusting the classification process itself. For example—classification results obtained when executing step 130 can be used for tuning the classification process to be applied in one or more iterations of step 150. Yet for another example, a second or a later iteration of step 150 may involve applying a classification process that is responsive to previously calculated classification results obtained during step 130 and during previous iterations of step 150.

The adjustment of the classification process may involve adjusting adjustable classification thresholds or performing other (or additional) adjustments of the classification process.

The adjustment of the classification process can be executed in addition to the re-segmentation or instead of the re-segmentation.

Figure 6:
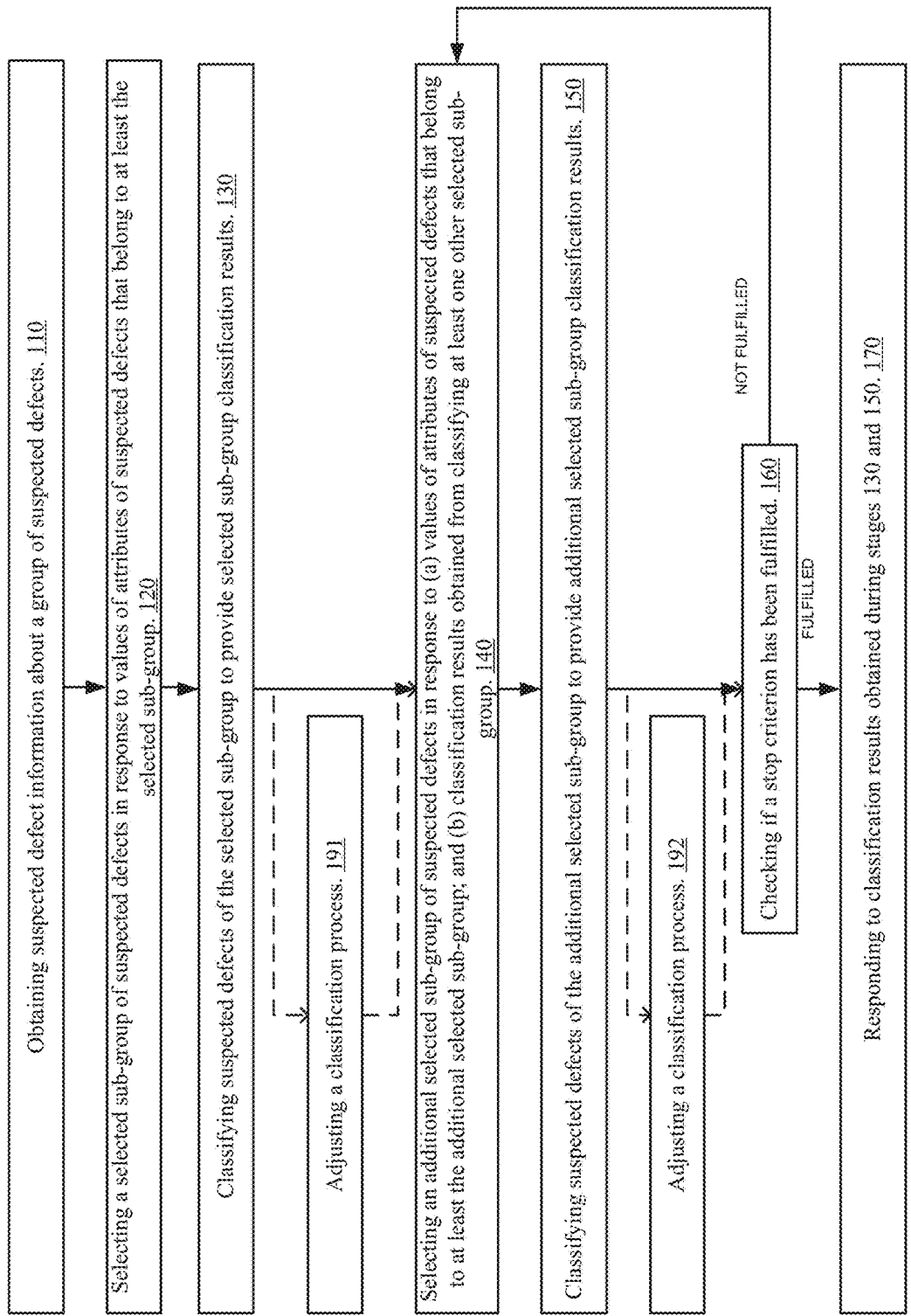
FIG. 6 illustrates method according to an embodiment of the invention.

FIG. 6 illustrates method 102 according to an embodiment of the invention.

As will be illustrated below—method 102 of FIG. 6 differs from method 100 of FIG. 1 by including additional steps 191 and 192

Method 102 may start by step 110 of obtaining defect candidate information about a group of defect candidates.

Step 110 may be followed by step 120 of selecting a selected sub-group of defect candidates in response to values of attributes of defect candidates that belong to at least the selected sub-group.

Step 120 may be followed by step 130 of classifying defect candidates of the selected sub-group to provide selected sub-group classification results.

Step 130 may be followed by steps 191 and 140.

Step 191 may include adjusting a classification process to be applied during one or more iterations of step 150. Step 191 may be followed by step 140.

Step 130 may be followed by step 140 selecting an additional selected sub-group of defect candidates in response to (a) values of attributes of defect candidates that belong to at least the additional selected sub-group; and (b) classification results obtained from classifying at least one other selected sub-group.

Step 140 may be followed by step 150 of classifying defect candidates of the additional selected sub-group to provide additional selected sub-group classification results.

Step 150 may be followed by steps 160 and 192.

Step 192 may include adjusting a classification process to be applied during one or more iteration of step 150. Step 192 may be followed by step 160.

Step 160 may include checking if a stop criterion has been fulfilled. If so—jumping to step 170. Else—jumping to step 140.

Step 170 may include responding to classification results obtained during steps 130 and 150.

It is noted that method 102 may include only one of steps 191 and 192. Additionally or alternatively, step 170 may include at least one of steps 191 and 192.

It is noted that any combination of any one of methods 100, 101 and 102 may be provided. For example, step 130 or 150 may be followed (and step 170 may include) by (a) performing multiple classification iterations to provide multiple classification iteration results and (b) adapting adjustable classification thresholds and segmenting the attribute hyperspace to segments in response to the multiple classification iteration results. The adjustable classification thresholds are utilized during the multiple classification iterations.

Figure 7A:
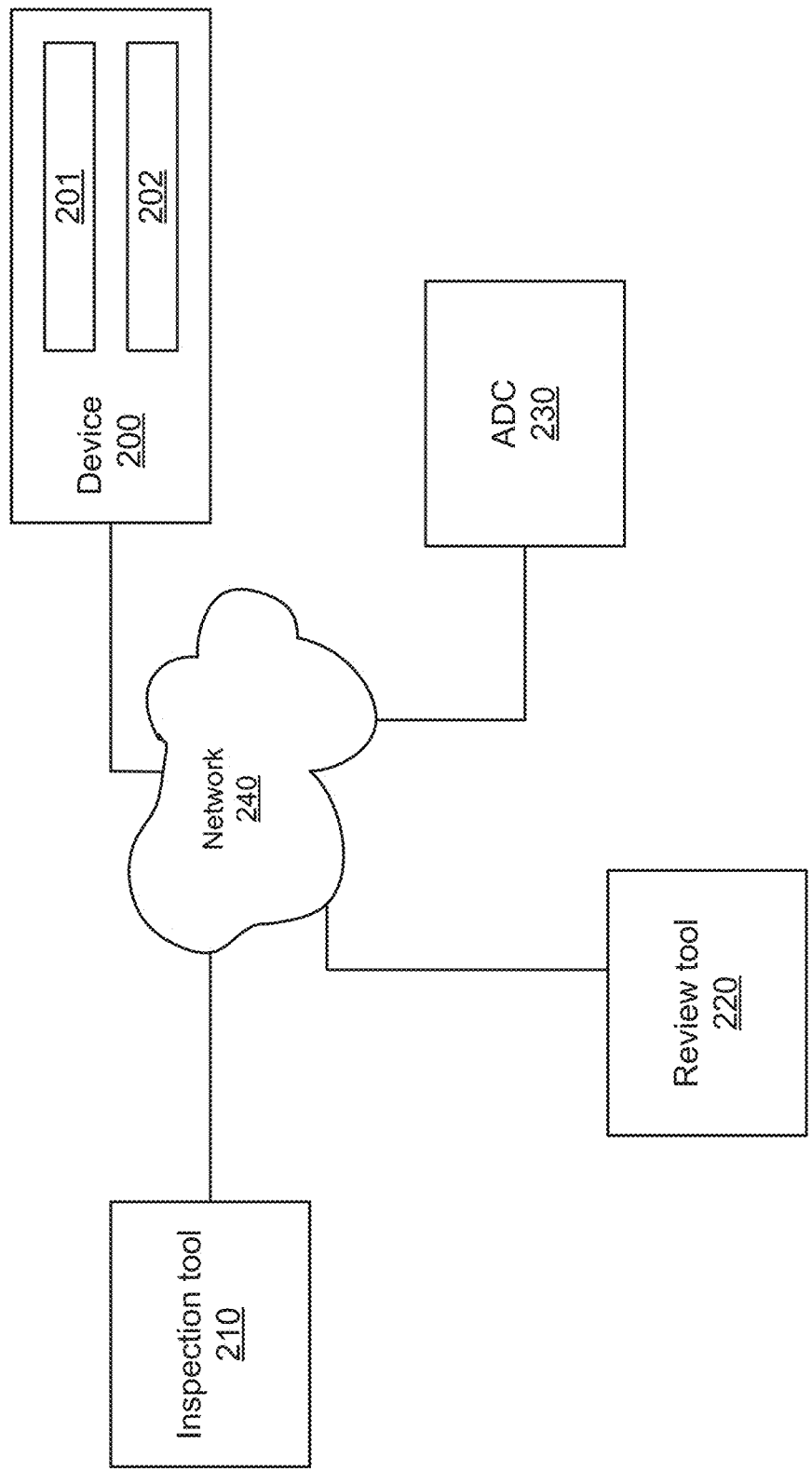
FIG. 7A illustrates a system according to an embodiment of the invention.

FIG. 7A illustrates device 200 and its environment according to an embodiment of the invention.

FIG. 7A illustrates device 200, inspection tool 210, review tool 220, automatic defect classifier 230 and fab yield management system 250.

A network 240 is coupled to device 200, inspection tool 210, review tool 220 and automatic defect classifier (ADC) 230. For example, network 240 may be a fab communication system. For simplicity of explanation, only a single inspection tool 210 and a single review tool 220 are shown. It should be noted that in practice, a plurality of inspection tools may be connected to a plurality of review tools via network 240. For further simplicity of explanation, a single ADC system 230 is shown. It should be noted that more than one ADC system 230 can be used.

The invention is not limited by the type of physical communication and coupling provided between the various entities 200-250. According to one embodiment of the invention, device 200 may be coupled to one or more of entities 210-250 via the network 240 communication infrastructures. According to another embodiment of the invention, device 200 may be coupled via a direct communication line to one or more of entities 210-250.

For simplicity of explanation, device 200 is shown as a stand-alone computer system. It is noted that device 200 may be a part of the inspection tool 210, of the review tool 220, ADC 230 and/or of the YMS 250. In any of these configurations, device 200 may be coupled to the other system (e.g. inspection tool 210, review tool 220, ADC system 230 or YMS) directly and not via network 240. The components of device 200 may be integrated with the components of any of tools and systems 210, 220, 230 and 250. According to an embodiment of the invention, device 200 may be facilitated as a hardware utility which is placed on the electronic rack of, for example, the inspection tool 210, the review tool 220, the ADC tool 230 or the fab yield management system 250. According to embodiments of the invention, the device 200 may be coupled directly to the data analysis processor of the hosting tool. According to embodiments of the invention, device 200 is facilitated as a software utility that is operated by the data analysis processor of either one of entities 210-250.

Device 200 may be arranged to execute any one of method 100, 101 and 102 or a combination of any steps of these methods.

Device 200 may include a memory unit 201 and a processor 202.

The memory unit 201 may store at least one of (a) information required for executing one or more of methods 100-102, (b) software required for executing one or more of methods 100-102, (c) information generated during the execution of one or more of methods 100-102.

Processor 202 may perform any operation required during any step of one or more of methods 100-102.

For example, memory unit 201 may be arranged to store defect candidate information about a group of defect candidates.

Processor 202 may be arranged to:
a. Select a selected sub-group of defect candidates in response to values of attributes of defect candidates that belong to at least the selected sub-group.
b. Classify defect candidates of the selected sub-group to provide selected sub-group classification results.
c. Repeat, until fulfilling a stop condition: (i) selecting an additional selected sub-group of defect candidates in response to (a) values of attributes of defect candidates that belong to at least the additional selected sub-group; and (b) classification results obtained from classifying at least one other selected sub-group; and
d. Classify defect candidates of the additional selected sub-group to provide additional selected sub-group classification results.

According to an embodiment of the invention the stop condition may be determined automatically, partially automatically or manually. A person may provide the stop condition and may, additionally or alternatively, determine to stop the repetition even regardless of a previously defined stop condition.

The selection of the selected sub-group of defect candidates may be responsive to levels of interest. A level of interest of a defect candidate may be related to the location of the defect candidate. For example—the selection may tend to select defect candidates that are located at regions of interest.

Yet for another example, processor 202 may be arranged to provide defect information that reflects the classification process results.

Figure 7B:
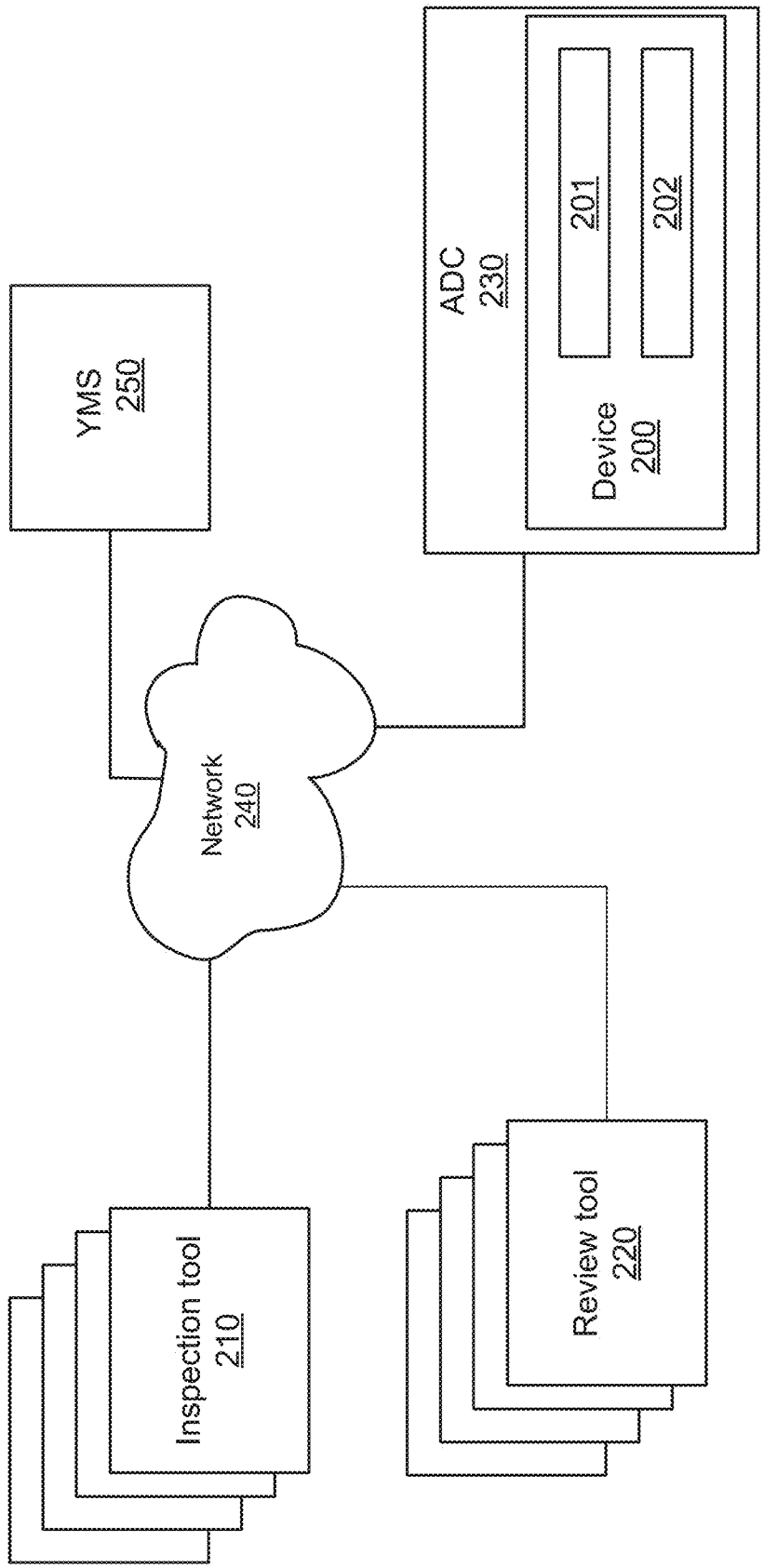
FIG. 7B illustrates a system according to an embodiment of the invention.

According to an embodiment of the invention, as shown in FIG. 7B, device 200 is integrated with ADC system 230. ADC 230 and device 200 serve multiple of inspection tools 210 and a plurality of review tools 220 via network 240 and under the supervision of YMS 250.

Figure 7C:
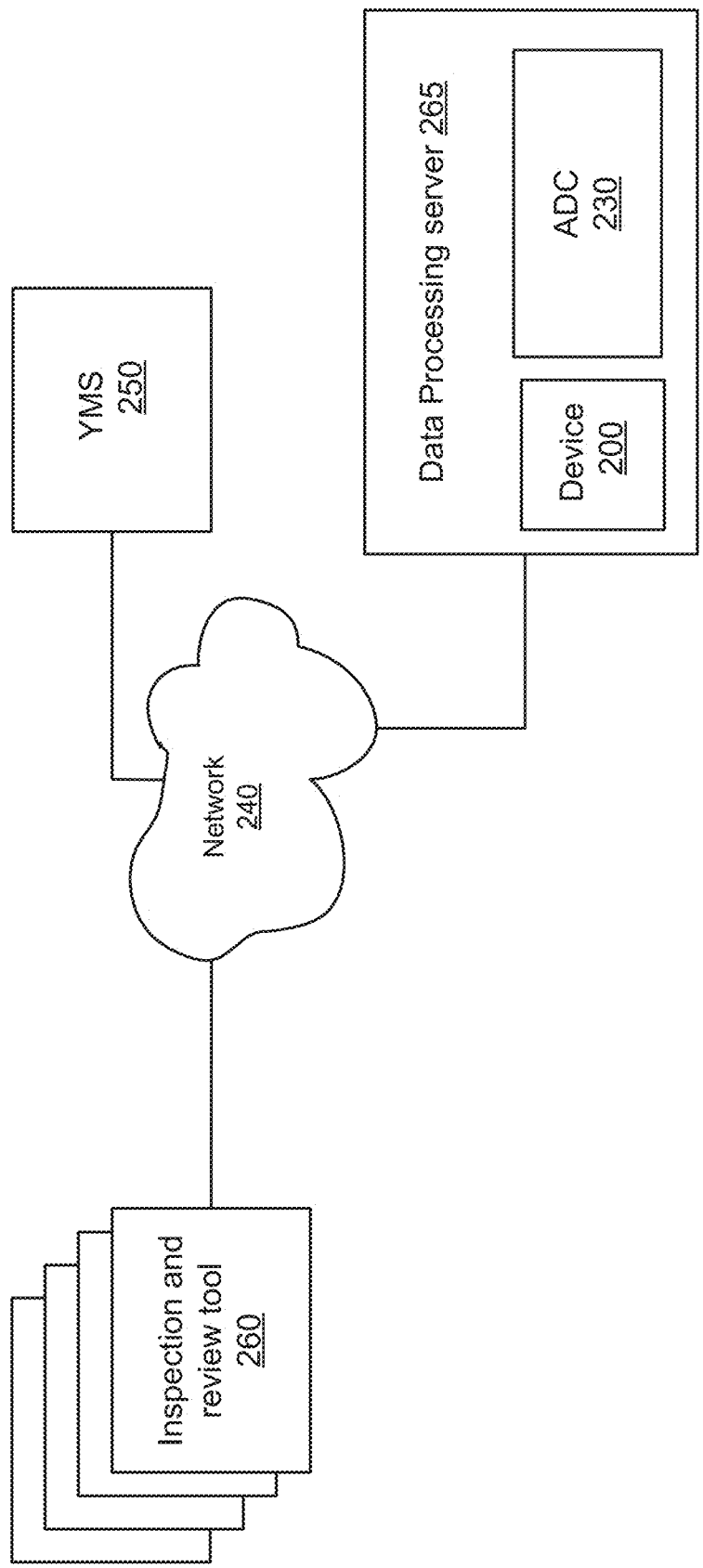
FIG. 7C illustrates a system according to an embodiment of the invention.

According to another embodiment of the invention, illustrated in FIG. 7C, ADC 230 and device 200 are integrated with review tool 220.

Figure 7D:
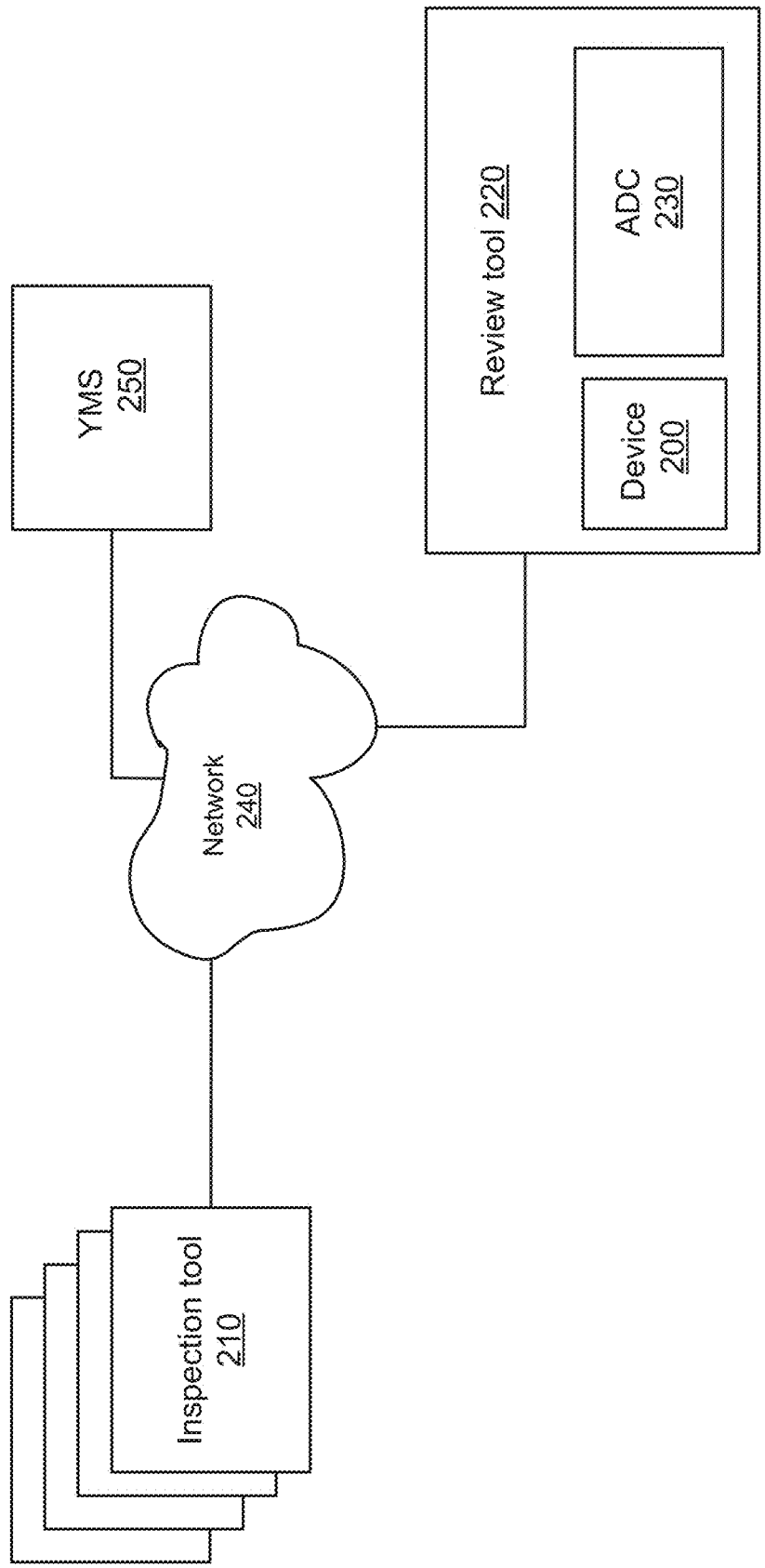
FIG. 7D illustrates a system according to an embodiment of the invention.

According to the embodiment illustrated in FIG. 7D, the inspection operation and review operation and provided by a single platform—Inspection and Review tool 260. Device 200 together with ADC 230 are facilitated by a single platform—Data Processing Server 265. The data processing server 265 is coupled to the Inspection and Review tool 260 via the network 240 or directly.

Figure 7E:
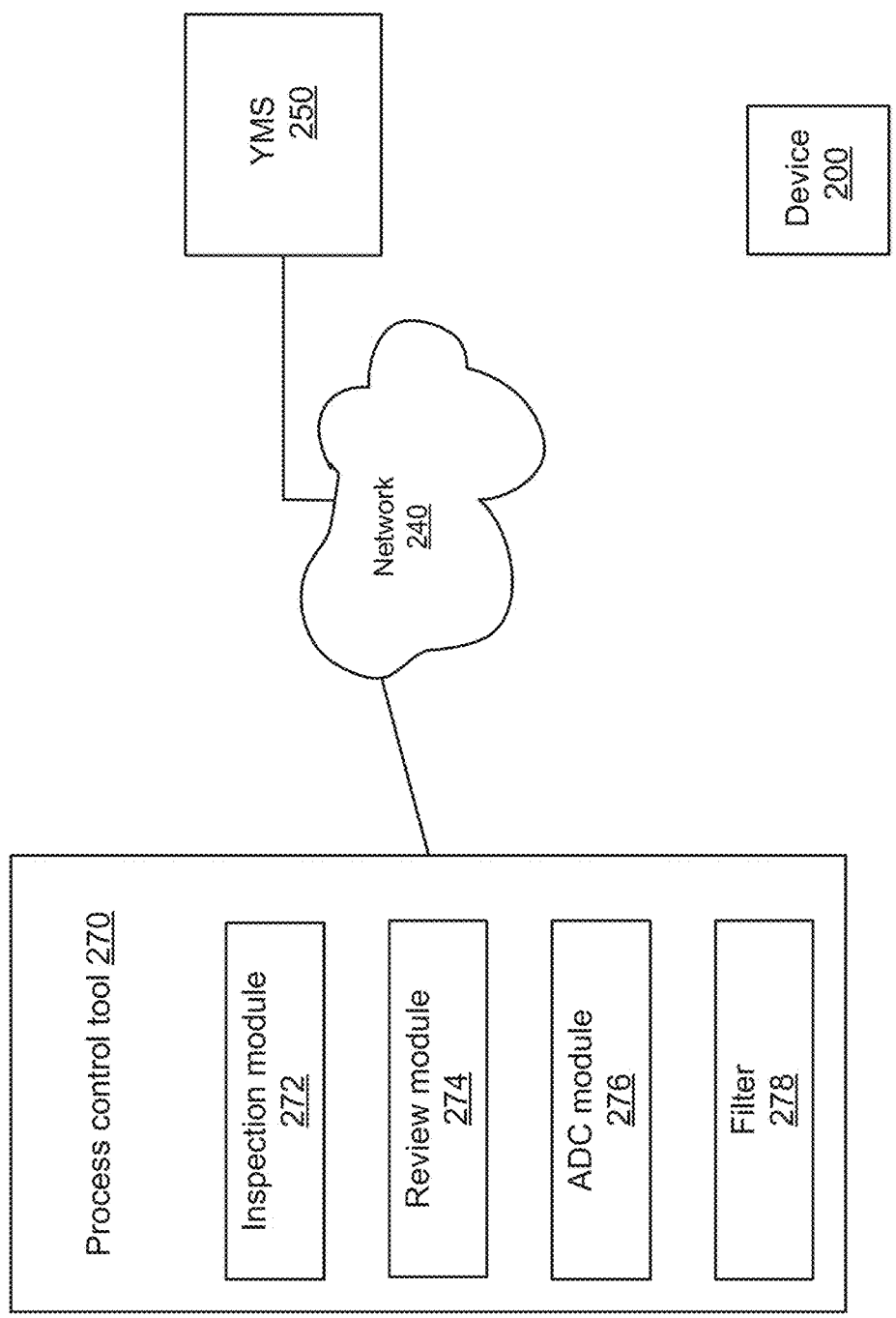
FIG. 7E illustrates a system according to an embodiment of the invention.

Yet another embodiment of the invention is illustrated in FIG. 7E. in this embodiment, a single platform accommodate an inspection module 272; review module 274, ADC module 276 and filter 278.

In any one of FIGS. 7A-7E the various tools, devices and module may communicate with each other in any manner known in the art. For example—the communication may be based on existing result file format (such as but not limited to KLARF™ of KLA Inc.), enhanced result file format or a dedicated format.

Figure 8:
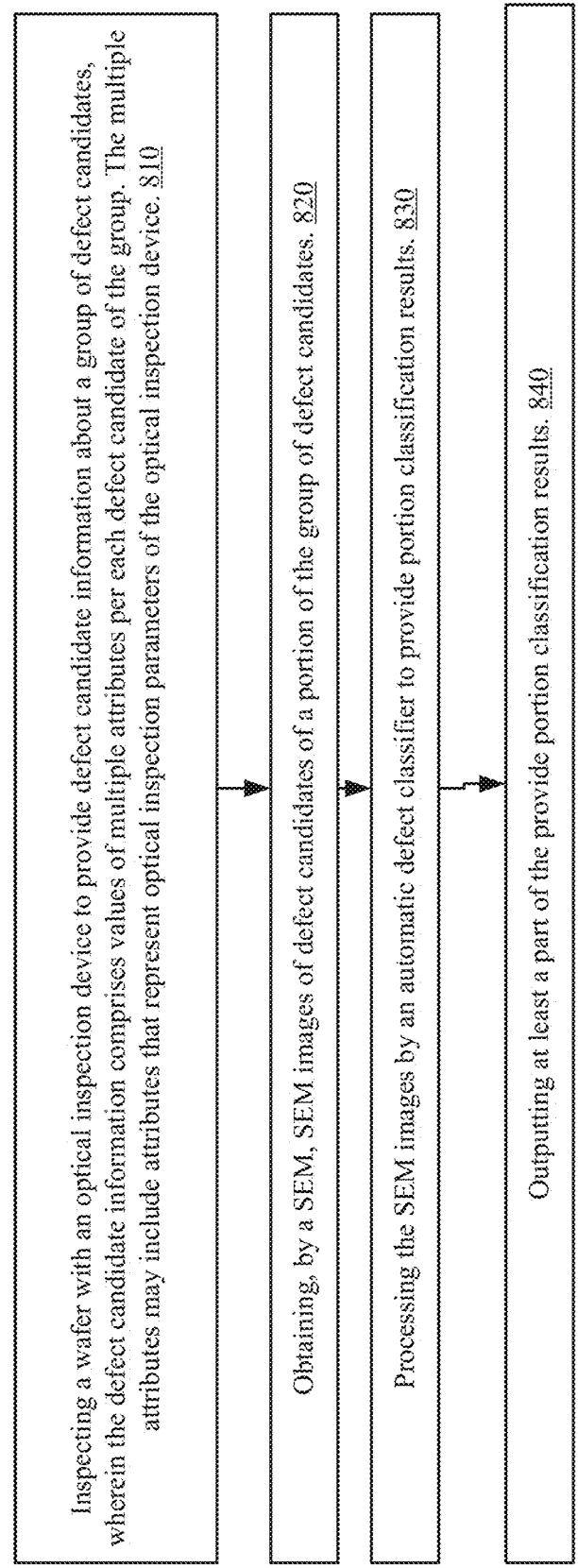
FIG. 8 illustrates a method according to an embodiment of the invention.

FIG. 8 illustrates method 800 according to an embodiment of the invention. Method 8 may be carried out by the systems illustrated in FIGS. 7A-7E as well as by variant configurations.

Method 800 may start by stage 810 of inspecting a wafer with an optical inspection entity (for example, inspection tool 210 or inspection module 272) to provide defect candidate information about a group of defect candidates, wherein the defect candidate information comprises values of multiple attributes per each defect candidate of the group. The multiple attributes may include attributes that represent optical inspection parameters of the optical inspection device.

Stage 810 may be followed by stage 820 of obtaining, by a scanning electron microscope (SEM) (e.g. Review tool 220 or review module 274), SEM images of defect candidates of a portion of the group of defect candidates.

Stage 820 may be followed by stage 830 of processing the SEM images by an automatic defect classifier (e.g. ADC 230 as a stand-alone device, as an integrated utility) to provide portion classification results.

Stage 830 may be followed by stage 840 of outputting at least a part of the provide portion classification results.

Stages 820-830 may be executed in an iterative manner during which a selected sub-group of defect candidates is imaged and classified. Thus, method 800 may include executing method 100.

The configurations 7A-7E all differ from prior art configurations by having device 200. In the following, the operation of the entities 200-250 will be described in a fictional manner, irrespective of their specific hardware configuration and facilitation. Without the novel functionality provided by device 200 and, the entities 210-250 interact with each other in accordance with prior art sequence of operations: The YMS 250 generates inspection instructions A and provides the inspection tool 210 with these inspection instructions. Inspection tool 210 executes the inspection based on the inspection instructions and an inspection recipe that was generated during a recipe setup stage. Inspection tool 210 provides the YMS 250 with inspection results. The YMS 250 provides the review tool 220 with review instructions, based on the inspection results and YMS sampling plan. The review tool 220 executes the review, based on the review instructions and a review recipe that was generated during a recipe setup stage. The review tool 220 communicates with the ADC 230 and analyzes the review results based on ADC output input received from the ADC 230. The review tool 220 provides the YMS 240 with review results F. This flow of operations is typically performed per wafer inspection.

Figure 9:
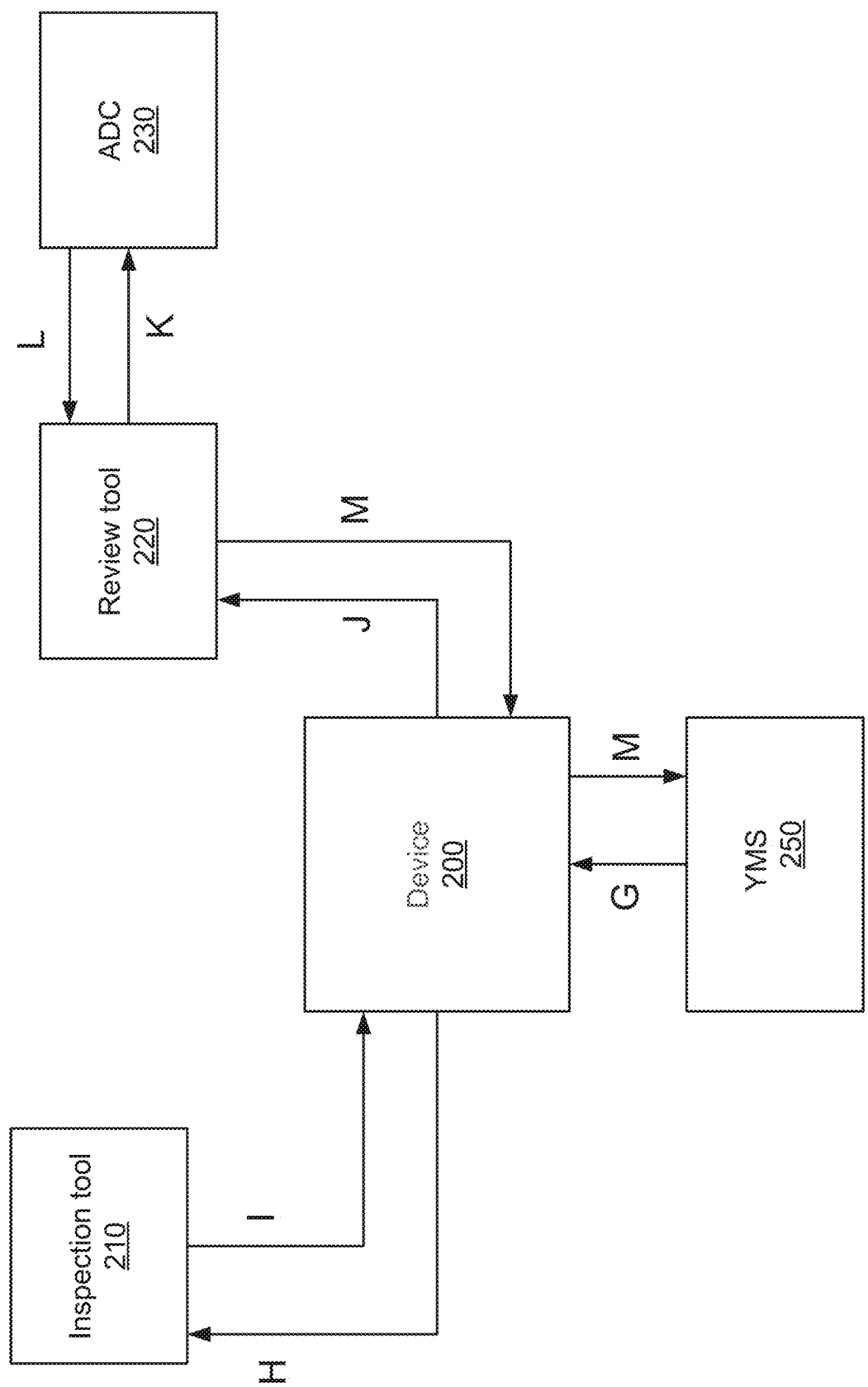
FIG. 9 illustrates a system according to an embodiment of the invention.

FIG. 9 illustrates a novel flow of operations in accordance with an embodiment of the invention.

The flow may include the following steps:
a. YMS 250 provides device 200 with YMS instructions G.
b. Device 200 provides inspection tool 210 with inspection instructions H.
c. Inspection tool 210 executes the inspection and provides device 200 with inspection results I. Inspection tool 210 performs inspection including defect detection, but not including nuisance filtering. Inspection results I include all of the results generated by the inspection defect detection operation.
d. Device 200 samples the inspection results I and provides the review tool 220 with review instructions J.
e. The review tool 220 communicates with the ADC 230 (ADC input K) and analyzes the review results based on ADC output L input received from the ADC 230.
f. The review tool 220 provides device 200 (and/or YMS 250) with review results M.
g. YMS 250 receives review results M.

Optionally, the analysis of the review results is completed by the ADC 230 and review results are provided to YMS 250 by ADC 230. Optionally (not shown), ADC 230 is integrated with Review tool 220 and ADC input K and ADC output L are generated as part of the performance of the integrated review-ADC system. Optionally (not shown), additional computing systems are involved in the inspection-sampling-review process.

Thus, the quality and efficiency of the filtering of inspection results is improved by filtering the inspection results using the results of defect classification. The quality of sampling of review defect of interest is improved by performing adaptive selection of review defect of interest based on the abundance of inspection results in combination with defect classification results. Additional improvement is achieved by facilitating automated sampling of review defects of interest.

According to an embodiment of the invention, device 200 uses a predefined sampling stop condition and until this predefined sampling stop condition is met, sampling (resulting in review instruction J) and review detection and classification (resulting in ADC input K, ADC output L and review results M) are performed in an iterative manner. This iterative sampling is performed per wafer inspection. For example, at a certain inspection cycle (e.g. inspection of wafer number n) a certain location is associated with a true defect; and based on review results of wafer number n, for the analysis of inspection results of wafer number n+1, it is associated with a nuisance.

In accordance with an embodiment of the invention, device 200 uses inspection and review outputs (I and M) for updating the sampling stop condition in a dynamic matter.

In accordance with an embodiment of the invention, device 200 provides inspection tool 210 with inspection recipe update instructions. In accordance with an embodiment of the invention, inspection instructions includes instructions aimed for updating inspection recipe settings, for example, updated optical settings. According to another embodiment of the invention, inspection instructions include instructions aimed for tuning the detection algorithm used by inspection tool 200 for defect detection. Thus, optical configuration and detection algorithm are updated in a dynamic manner over the inspection of a plurality of wafers. As a result, changes caused due to manufacturing process variations can be compensated for. In addition, changes caused due to variations of the inspection tool processes (e.g. changes in the operation of optical components, electrical components and mechanical components over time) can also be compensated for. Over time, optimization of optical configuration and defect detection can be achieved, thereby increasing signal collection and sensitivity.

Typically, defect candidate attributes are provided by the inspection tool in the form of defect result file. Defect files which are commonly in use for manufacturing of semiconductor devices are characterized by a defect file format. Commonly, the inspection tool generates defect candidate attributes in accordance with the defect file format and writes the defect candidate attributes into the defect result file. The defect file is commonly shared between various entities within the fab, such as between the inspection tools, review tools and fab yield management system. According to an embodiment of the invention, certain defect candidate attributes may not be defect file format attributes. Such attributes can be regarded as "internal" inspection tool information that is not outputted outside the inspection tool in prior art inspection tools.

In accordance with embodiments of the invention, the selecting of a selected sub-group of defect candidates in response to values of attributes of defect candidates (step 120 illustrated in FIG. 1) and/or the selecting an additional selected sub-group of defect candidates in response to values of attributes of defect candidates (step 140 illustrated in FIG. 1) are performed based on a set of attributes that is different from the set of attributes which is defined by prior art defect files. According to an embodiment of the invention, an attribute file is shared between entities 200, 210,220, 230 and optionally 250. This attribute file can be in addition to, or as a replacement of, the inspection result file that is commonly shared.

Thus, an additional improvement to the quality and efficiency of sampling of review defects of interest is achieved by processing many types of inspection attributes, including attributes which are not commonly available by prior art defect result files.

It is noted that an inspection process is typically performed by an inspection tool of a first resolution and of a first throughput while a review process is typically performed by a review tool of a second resolution and of a second throughput. The first resolution is lower (coarser) than the second resolution and the first throughput is higher than the second throughput.

Accordingly—the volume of the inspection data provided by the inspection tool thus far exceeds the volume of review data provided by the review tool. This is reflected also in the area which is covered by each one of the inspection tool and the review tool. Typically inspection provides full/high coverage of wafer area while review is limited to specific regions around locations of interest.

It is noted that the inspection tool and the review tool are non-limiting examples of two evaluation tools that differ from each other by resolution and may also differ by throughput. The first tool may generate images that may be referred to as first tool images. The second tool may generate images that may be referred to as second tool images. Second tool images may be, for example, SEM images, STEM images, TEM images, ion beam images and the like.

Figure 10:
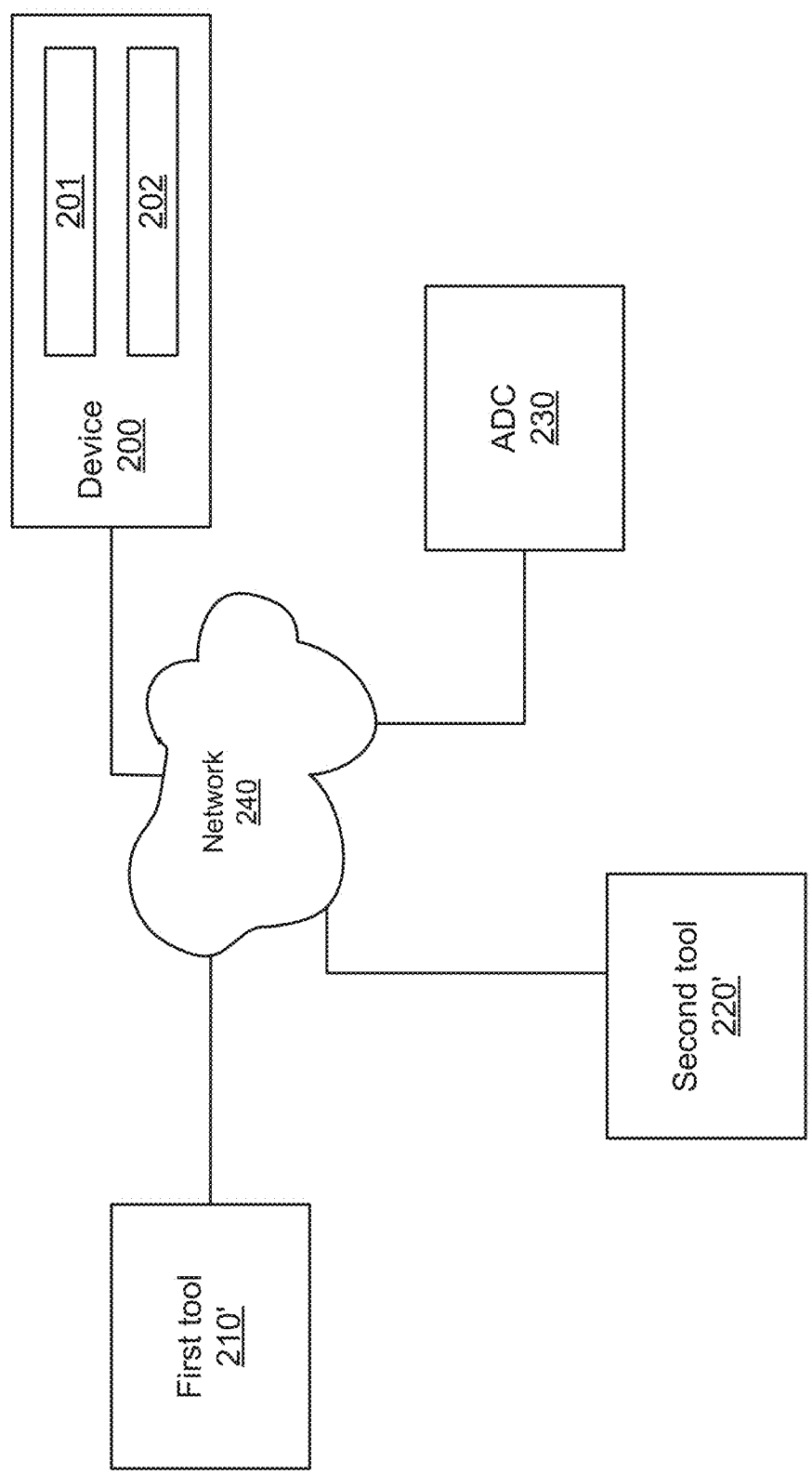
FIG. 10 illustrates a system according to an embodiment of the invention.

A device such as a filtering and processing device may be arranged to receive an abundance of alarm information generated by the first tool and filter it with the use of information obtained from the second tool or from another source of information such as a design data. FIG. 10 illustrates a first tool 210', second tool 220', network 240, ADC 230 and device 200 that includes memory unit 201 and a processor 202 according to an embodiment of the invention. FIG. 10 differs from FIG. 7A by having first tool 210' and second tool 220' instead of inspection tool 210 and review tool 220 respectively. The first tool 210' provides information about an object at a lower resolution and higher throughput than the information provided by the second tool 220' about the object. Any one of FIGS. 7B-7E may be amended accordingly by replacing inspection tool 210 and review tool 220 or an inspection and review tool by first tool 210' and second tool 220' or a first and second tool.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Figure 11:
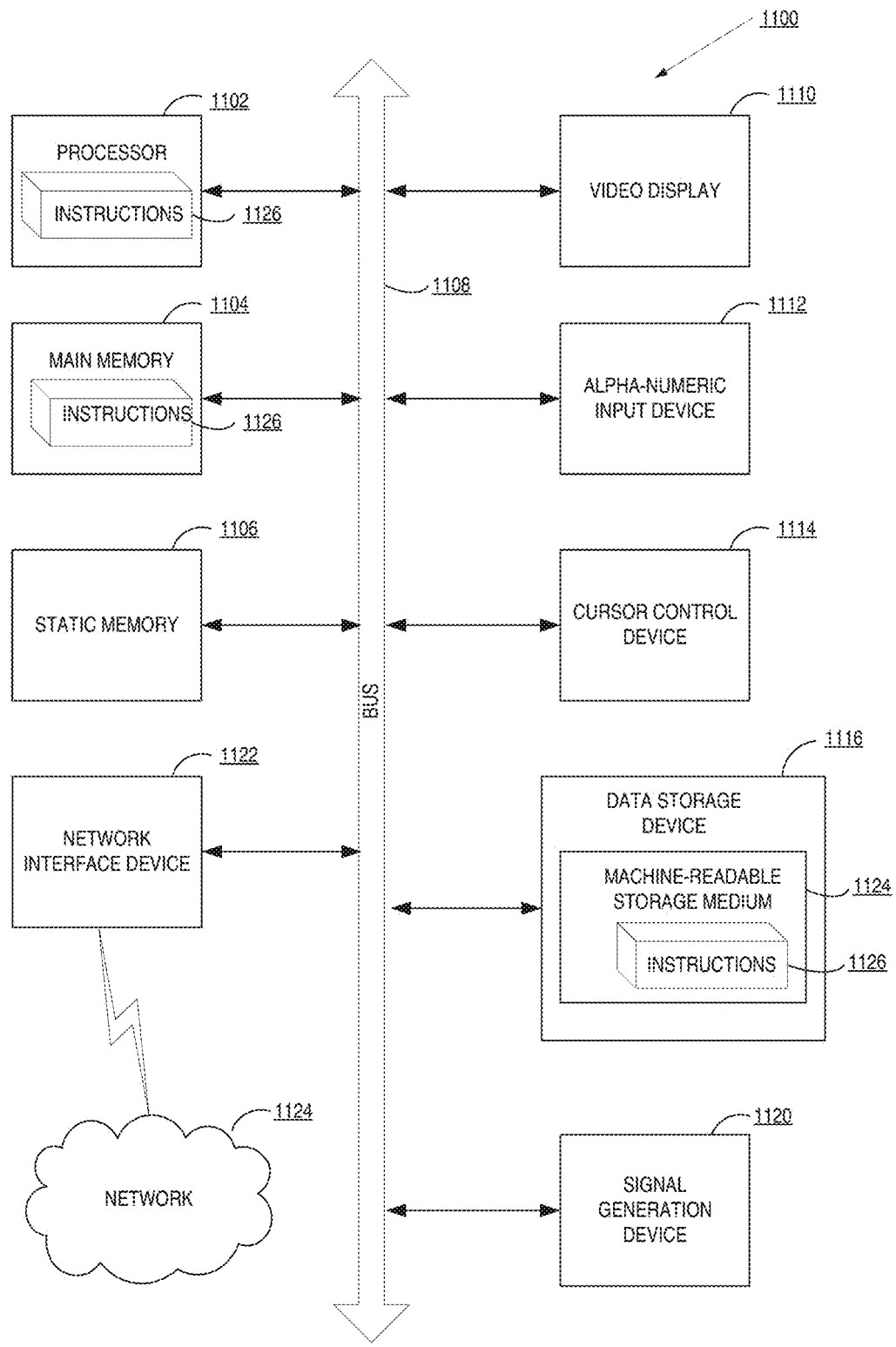
FIG. 11 is a block diagram of an example computer system that may perform one or more of the operations described herein, in accordance with various implementations.

FIG. 11 illustrates a diagrammatic representation of a machine in the exemplary form of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1116, which communicate with each other via a bus 1108. Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions 1126 for performing the operations and blocks discussed herein.

The computer system 1100 may further include a network interface device 1122. The computer system 1100 also may include a video display unit 1110 (e.g., a liquid crystal display (LCD), a cathode ray tube (CRT), or a touch screen), an alphanumeric input device 1112 (e.g., a keyboard), a cursor control device 1114 (e.g., a mouse), and a signal generation device 1120 (e.g., a speaker).

The data storage device 1116 may include a computer-readable storage medium 1124 on which is stored one or more sets of instructions 1126 (e.g., components of content sharing platform 120) embodying any one or more of the methodologies or functions described herein. The instructions 1126 may also reside, completely or at least partially, within the main memory 1104 and/or within the processor 1102 during execution thereof by the computer system 1100, the main memory 1104 and the processor 1102 also constituting computer-readable storage media. The instructions 1126 may further be transmitted or received over a network 1124 via the network interface device 1122.

While the computer-readable storage medium 1124 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising
   in response to an inspection of a wafer by an inspection tool using an inspection recipe, obtaining data indicative of a group of defect candidates, wherein the data comprises values of attributes for each defect candidate of the group of defect candidates, wherein the values of attributes span an attribute hyperspace that is segmented;
   iteratively selecting, using the segmented attribute hyperspace, sub-groups of defect candidates from the group of defect candidates for review using a review recipe to classify the defect candidates in each selected sub-group, wherein the iterative selecting is based on the values of attributes of respective defect candidates and classification results of previously reviewed defect candidates, and wherein the iterative selecting is continued until a sampling stop condition is fulfilled to obtain a classification output for the wafer;
   using the classification output obtained for the wafer to alter instructions specifying at least one of the sampling stop condition, the inspection recipe, or the review recipe; and
   classifying, by a processing device, additional defect candidates in the next wafer by using the altered instructions that used the classification output obtained for the wafer.

2. The method of claim 1, wherein the iteratively selecting the sub-groups of defect candidates comprises:
   selecting, from the group of defect candidates, a first sub-group of defect candidates for review, wherein selecting the first sub-group is based on the values of attributes of defect candidates included in the first sub-group;
   upon reviewing the first sub-group of defect candidates by a review tool, receiving classification results of the first sub-group of defect candidates;
   selecting, from the group of defect candidates, an additional sub-group of defect candidates for review, wherein the selecting of the additional sub-group of defect candidates for review is based on the values of attributes of defect candidates that belong to the additional selected sub-group and classification results of defect candidates selected for review in a previously selected sub-group; and
   upon reviewing the additional sub-group of defect candidates, receiving classification results of the selected additional sub-group of defect candidates, wherein selecting the additional sub-group of defect candidates for review and receiving the classification results of the selected additional sub-group of defect candidates are repeated until a sampling stop condition is fulfilled.

3. The method of claim 1, wherein altering the inspection recipe corresponds to altering optical settings of the inspection tool.

4. The method of claim 1, wherein altering the inspection recipe corresponds to altering a detection algorithm used by the inspection tool for obtaining the data indicative of the group of defect candidates.

5. The method of claim 1, wherein the stop condition is associated with a purity level or a number of images of defect candidates that have been obtained.

6. The method of claim 1, wherein the selected sub-groups of defect candidates do not comprise defect candidates included in a previously selected sub-group of defect candidates.

7. The method of claim 1, wherein the inspection tool is associated with an optical inspection.

8. A system comprising:
   a memory; and
   a processing device, operatively coupled with the memory, to:
   in response to an inspection of a wafer by an inspection tool using an inspection recipe, obtain data indicative of a group of defect candidates, wherein the data comprises values of attributes for each defect candidate of the group of defect candidates, wherein the values of attributes span an attribute hyperspace that is segmented;
   iteratively select sub-groups of defect candidates from the group of defect candidates for review using a review recipe to classify the defect candidates in each selected sub-group, wherein the iterative selecting is based on the values of attributes of respective defect candidates and classification results of previously reviewed defect candidates, and wherein the iterative selecting is continued until a sampling stop condition is fulfilled to obtain a classification output for the wafer;
   use the classification output obtained for the wafer to alter instructions specifying at least one of the sampling stop condition, the inspection recipe, or the review recipe; and
   classify additional defect candidates in the next wafer by using the altered instructions that used the classification output obtained for the wafer.

9. The system of claim 8, wherein to iteratively select the sub-groups of defect candidates, the processing device is further to:
   select, from the group of defect candidates, a first sub-group of defect candidates for review, wherein selecting the first sub-group is based on the values of attributes of defect candidates included in the first sub-group;
   upon reviewing the first sub-group of defect candidates by a review tool, receive classification results of the first sub-group of defect candidates;
   select, from the group of defect candidates, an additional sub-group of defect candidates for review, wherein the selecting of the additional sub-group of defect candidates for review is based on the values of attributes of defect candidates that belong to the additional selected sub-group and classification results of defect candidates selected for review in a previously selected sub-group; and
   upon reviewing the additional sub-group of defect candidates, receive classification results of the selected additional sub-group of defect candidates, wherein the processing device is to select the additional sub-group of defect candidates for review and to receive the classification results of the selected additional sub-group of defect candidates repeatedly until a sampling stop condition is fulfilled.

10. The system of claim 8, wherein altering the inspection recipe corresponds to altering optical settings of the inspection tool.

11. The system of claim 8, wherein altering the inspection recipe corresponds to altering a detection algorithm used by the inspection tool for obtaining the data indicative of the group of defect candidates.

12. The system of claim 8, wherein the stop condition is associated with a purity level or a number of images of defect candidates that have been obtained.

13. The system of claim 8, wherein the selected sub-groups of defect candidates do not comprise defect candidates included in a previously selected sub-group of defect candidates.

14. The system of claim 8, wherein the inspection tool is associated with an optical inspection.

15. A non-transitory computer readable medium comprising instructions, which when executed by a processing device, cause the processing device to perform operations comprising:
  in response to an inspection of a wafer by an inspection tool using an inspection recipe, obtaining data indicative of a group of defect candidates, wherein the data comprises values of attributes for each defect candidate of the group of defect candidates, wherein the values of attributes span an attribute hyperspace that is segmented;
  iteratively selecting, using the segmented attribute hyperspace, sub-groups of defect candidates from the group of defect candidates for review using a review recipe to classify the defect candidates in each selected sub-group, wherein the iterative selecting is based on the values of attributes of respective defect candidates and classification results of previously reviewed defect candidates, and wherein the iterative selecting is continued until a sampling stop condition is fulfilled to obtain a classification output for the wafer;
  using the classification output obtained for the wafer to alter instructions specifying at least one of the sampling stop condition, the inspection recipe, or the review recipe; and
  classifying additional defect candidates in the next wafer by using the altered instructions that used the classification output obtained for the wafer.

16. The non-transitory computer readable medium of claim 15, wherein iteratively selecting the sub-groups of defect candidates further comprises:
  selecting, from the group of defect candidates, a first sub-group of defect candidates for review, wherein selecting the first sub-group is based on the values of attributes of defect candidates included in the first sub-group;
  upon reviewing the first sub-group of defect candidates by a review tool, receiving classification results of the first sub-group of defect candidates;
  selecting, from the group of defect candidates, an additional sub-group of defect candidates for review, wherein the selecting of the additional sub-group of defect candidates for review is based on the values of attributes of defect candidates that belong to the additional selected sub-group and classification results of defect candidates selected for review in a previously selected sub-group; and
  upon reviewing the additional sub-group of defect candidates, receiving classification results of the selected additional sub-group of defect candidates, wherein selecting the additional sub-group of defect candidates for review and receiving the classification results of the selected additional sub-group of defect candidates are repeated until a sampling stop condition is fulfilled.

17. The non-transitory computer readable medium of claim 15, wherein altering the inspection recipe corresponds to altering optical settings of the inspection tool.

18. The non-transitory computer readable medium of claim 15, wherein altering the inspection recipe corresponds to altering a detection algorithm used by the inspection tool for obtaining the data indicative of the group of defect candidates.

19. The non-transitory computer readable medium of claim 15, wherein the stop condition is associated with a purity level or a number of images of defect candidates that have been obtained.

20. The non-transitory computer readable medium of claim 15, wherein the selected sub-groups of defect candidates do not comprise defect candidates included in a previously selected sub-group of defect candidates.

* * * * *